(12) United States Patent
Lothe et al.

(10) Patent No.: US 10,986,844 B2
(45) Date of Patent: Apr. 27, 2021

(54) MACHINES AND METHODS FOR MAKING FLATBREADS

(71) Applicant: SIMPLECIOUS, LLC, Alpharetta, GA (US)

(72) Inventors: Sudhir P. Lothe, Alpharetta, GA (US); James Noah Mcneely, Alpharetta, GA (US); Donald A. Muntner, Alpharetta, GA (US)

(73) Assignee: SIMPLECIOUS, LLC, Alpharetta, GA (US)

( * ) Notice: Subject to any disclaimer, the term of this patent is extended or adjusted under 35 U.S.C. 154(b) by 254 days.

(21) Appl. No.: 16/116,443

(22) Filed: Aug. 29, 2018

(65) Prior Publication Data
US 2019/0021346 A1    Jan. 24, 2019

Related U.S. Application Data

(63) Continuation of application No. 15/700,313, filed on Sep. 11, 2017, now Pat. No. 10,080,369, which is a
(Continued)

(51) Int. Cl.
*A21B 5/03* (2006.01)
*A21C 11/00* (2006.01)
(Continued)

(52) U.S. Cl.
CPC ............. *A21B 7/005* (2013.01); *A21B 5/03* (2013.01); *A21C 1/146* (2013.01); *A21C 5/00* (2013.01);
(Continued)

(58) Field of Classification Search
CPC ..... A47J 36/165; A47J 37/0611; A21B 7/005; A21B 5/03; A21B 5/04; A21C 11/006; A21C 11/004; B27N 3/203; B27N 3/20
(Continued)

(56) References Cited

U.S. PATENT DOCUMENTS

| 4,345,514 A |   | 8/1982  | Morley |
|---|---|---|---|
| 4,417,867 A |   | 11/1983 | Bauer |
| 4,683,813 A | * | 8/1987  | Schultz .................... A21B 1/44 100/144 |
| 4,724,755 A | * | 2/1988  | Escamilla ................ A21B 5/03 99/349 |
| 4,948,611 A |   | 8/1990  | Cummins |

(Continued)

FOREIGN PATENT DOCUMENTS

| WO | 2014096989 | 6/2014 |
|---|---|---|
| WO | 2015097564 | 7/2015 |

OTHER PUBLICATIONS

International Application No. PCT/US2017/019660 filed on Feb. 27, 2017, International Search Report and Written opinion dated Apr. 24, 2017.

*Primary Examiner* — Reginald Alexander
(74) *Attorney, Agent, or Firm* — Thomas|Horstemeyer, LLP

(57) ABSTRACT

Various examples are related to making flatbreads such as, e.g., a compact machine for making flatbread in a residential kitchen-type environment or other countertop, tabletop, or space limited applications. In one example, a machine includes a hopper including a mixing chamber configured for bulk addition of raw materials for preparation of flatbread pieces; a mixing assembly configured to blend the raw materials into a flatbread dough mixture; a dough piecing assembly configured to generate a dough piece from an extruded portion of the flatbread dough mixture; a lower platen configured to transfer the pressed flatbread dough piece to a cooking zone on the dough contacting surface for cooking; and a flatbread ejection station configured to remove a cooked flatbread piece from the machine. A second cooking zone can be included to further cook the pressed flatbread dough piece prior to ejection from the machine.

20 Claims, 15 Drawing Sheets

Related U.S. Application Data continuation of application No. PCT/US2017/019660, filed on Feb. 27, 2017.

(60) Provisional application No. 62/300,790, filed on Feb. 27, 2016.

(51) Int. Cl.
  *A21B 7/00* (2006.01)
  *A21C 5/00* (2006.01)
  *A47J 37/06* (2006.01)
  *A21C 1/14* (2006.01)

(52) U.S. Cl.
  CPC ......... *A21C 11/006* (2013.01); *A47J 37/0611* (2013.01); *A21C 11/004* (2013.01)

(58) Field of Classification Search
  USPC .................................. 99/348, 349, 353, 357
  See application file for complete search history.

(56) References Cited

U.S. PATENT DOCUMENTS

| | | | |
|---|---|---|---|
| 5,396,833 A * | 3/1995 | Atwood | A21C 5/00 |
| | | | 99/349 |
| 5,630,358 A | 5/1997 | Patel | |
| 5,918,533 A | 7/1999 | Lawrence | |
| 6,015,584 A | 1/2000 | Lawrence | |
| 6,089,144 A | 7/2000 | Garber et al. | |
| 6,967,036 B1 | 11/2005 | Hedrington et al. | |
| 8,820,221 B2 | 9/2014 | Israni | |
| 9,788,687 B2 | 10/2017 | Frehn | |
| 2004/0194637 A1 * | 10/2004 | Gallina | A23P 30/10 |
| | | | 99/349 |
| 2005/0072311 A1 * | 4/2005 | Szymanski | A21B 5/03 |
| | | | 99/349 |
| 2011/0059211 A1 | 3/2011 | Chandi et al. | |
| 2015/0044340 A1 | 2/2015 | Ruiz Preciado et al. | |
| 2015/0181893 A1 | 7/2015 | Israni et al. | |
| 2015/0181894 A1 | 7/2015 | Israni et al. | |
| 2015/0181895 A1 | 7/2015 | Israni et al. | |
| 2015/0181897 A1 | 7/2015 | Israni et al. | |
| 2016/0067866 A1 | 3/2016 | Sekar et al. | |

* cited by examiner

MACHINES AND METHODS FOR MAKING FLATBREADS

CROSS REFERENCE TO RELATED APPLICATIONS

This application claims priority to, and the benefit of, U.S. utility application entitled "Machines and Methods for Making Flatbreads" having Ser. No. 15/700,313, filed Sep. 11, 2017, which claims priority to, and the benefit of, PCT Application No. PCT/US2017/019660, filed Feb. 27, 2017, where the PCT application claims priority to, and the benefit of, U.S. provisional application entitled "Machines and Methods for Making Flatbread" having Ser. No. 62/300,790, filed Feb. 27, 2016, all of which are hereby incorporated by reference in their entireties.

BACKGROUND

Many nationalities traditionally incorporate unleavened flatbread into meals. For example, roti (also called "chapatti") is a staple food in many South Asian and Asian countries, as well as in other parts the world. Similarly, tortillas are a staple food in Mexico and other Central American countries. While the basic ingredients used to prepare both tortillas and roti are very simple—generally, flour, water and oil and, optionally, salt—the process of making these flatbreads is time consuming, especially since during most meals each person consumes two or more pieces.

The making of flatbreads has traditionally been part of the domestic duties of women in a household, especially with extended families that include older women or girls. However, as family size decreases, women of all ethnic backgrounds enter the workplace, and/or young professionals remain single longer into adulthood, the labor intensive nature of preparing foodstuffs such as rotis and tortillas has made it less possible to make flatbread on demand in many households. Store-bought flatbreads have become widely available, but these nonetheless often lack the flavor and quality of freshly made. Moreover, even though they might be working outside the home and lack the time required to make batches of roti, tortillas etc., people often desire to provide their families with homemade food instead of that purchased from stores to evoke feelings of cultural significance.

Previous attempts have been proposed for in-home machines to make rotis and chapatis. For example, U.S. Pat. No. 5,630,358 (hereafter the '358 patent, which is hereby incorporated by reference in its entirety) describes an in-home roti maker with a dough mixing station and four circular rotating platens upon which individual pieces of flatbread dough are dispensed and flattened. The flattened dough pieces are then inverted and placed on a conveyor for cooking. The machine disclosed in the '358 patent, among other things, requires a large footprint that makes it unsuitable for most residential kitchens.

U.S. Pat. No. 8,820,221 (hereafter the '221 patent, which is hereby incorporated by reference in its entirety) is a more recent attempt to provide a machine to make flatbreads on demand in a residential kitchen setting. Notably, the '221 patent focuses on the supposed difficulty of measuring ingredients in the right amounts and includes features that certainly add to the cost and complexity of the machine disclosed therein. Such features include a number of sensors that appear to precisely dispense the raw material amounts and adjust the various aspects of the resulting flatbread, such as in texture, thickness and the like, and the resulting machine incorporates a number of "fail safe" features to allow a novice cook to create edible flatbreads. Since there are usually only about three ingredients in basic unleavened flatbreads (flour, water and oil and optionally, salt), and these ingredients are very inexpensive, the extensive engineering features of the machine disclosed in the '221 patent, as well as the related U.S. Pat. Nos. 9,125,421, 9,125,422 and U.S. Patent Publication Nos. 2015/0181897, 2015/0181896, 2015/0181895, 2015/0181894 and 2015/0181893 (all the disclosures of which are hereby incorporated by reference in their entireties), would appear to be an overly complicated solution to making unleavened flatbread in a residential kitchen environment. In short, it would appear unnecessary to build expensive fail safe electronics into a household appliance that uses low cost ingredients to make a simple food product. Unlike the manual mixing of flatbread, the dough is mixed one dough ball at a time. This may result in a dough quality that is not similar to the batch dough produced by the batch mixing of flatbread.

Similarly, U.S. Patent Publication No. 2015/0044340, the disclosure of which is incorporated herein in its entirety by this reference, also presents a fairly complex solution to making flatbread products at home. In the '340 publication, a flatbread dough is incorporated into a single use capsule. The machine of the '340 publication is purported to be fully automatic, requiring virtually no user effort outside of supplying the capsules. As discussed previously, during most meals, several pieces of flatbread, such as roti and tortillas are consumed by each person. With a single capsule required for each flatbread piece, much storage space is needed with this machine. The dough capsules, which have a shelf life of up to 6 weeks, also require refrigeration during the entire storage time from manufacturing, to the grocery store, to the kitchen environment. Moreover, each capsule will be priced at a high individual cost. For tortillas, this cost per piece is at least 5 times more than store bought tortillas cost, and is at least 10 times more than that of homemade. For rotis, the cost is at least 3 times more than store bought, and is at least 8 times that of homemade. Moreover, considerable environmental waste would be caused from disposal of the non-biodegradable dough capsules if use of this product becomes widespread, which reduces the suitability of this solution for widespread use.

There remains a need for a simple machine that can allow "homemade" flatbreads such as, e.g., roti and tortillas and the like to be made in a residential kitchen environment. The present disclosure provides for this and other benefits.

SUMMARY

Embodiments of the present disclosure are related to making flatbreads such as, e.g., roti or tortillas. In one aspect, a compact machine for making flatbread in a residential kitchen-type environment or other countertop, tabletop, or space limited applications is disclosed. Broadly, the flatbread machine can comprise a series of stations or assemblies (e.g., a raw material addition station, a mixing station, a dough piecing station, a dough pressing station, at least one cooking zone, a flatbread ejection station and/or combinations thereof) that facilitate the preparation of flatbread in small batches for consumption. Each of these stations can be in operational communication with one or more station to allow a plurality of flatbread pieces to be prepared substantially automatically after a user places appropriate raw materials in a mixing chamber and initiates operation of the process. The present disclosure also includes methods of making a plurality of flatbread pieces using the machine described herein.

In one embodiment, among others, a machine for preparing flatbread includes a hopper comprising a mixing chamber configured for bulk addition of raw materials for preparation of a plurality of flatbread pieces and a mixing assembly in operational communication with the hopper, the mixing assembly configured to blend the raw materials in the mixing chamber. The raw materials can comprise at least flour, water and oil and, optionally, salt, where each of the raw materials are not each engageably stored with the machine prior to addition of the raw materials to the hopper. The raw materials can be mixed for a time period suitable to allow the raw materials to be mixed into a flatbread dough mixture. The machine further comprises a dough piecing assembly in operational communication with the mixing assembly, the dough piecing assembly configured to generate a dough piece from the flatbread dough mixture; a dough pressing assembly in operational communication with the dough piecing assembly, the dough pressing assembly comprising a pressing platen configured to apply suitable pressure to the dough piece to form a pressed flatbread dough piece on a dough contacting surface of a lower platen located below the pressing platen; a cooking zone in operational communication with the dough pressing assembly, where the lower platen is configured to transfer the pressed flatbread dough piece to the cooking zone on the dough contacting surface; and a flatbread ejection station configured to remove a cooked flatbread from the machine. The dough piecing assembly can comprise a cutting device that cuts an extruded portion of the flatbread dough mixture to produce the dough piece, the dough contacting surface can comprise a substantially non-stick surface, and the cooking zone can comprise a heating element located below the lower platen opposite the dough contacting surface, the heating element configured to maintain a cooking temperature while the pressed flatbread dough piece is located in the cooking zone.

In one or more aspects of these embodiments, the cooking temperature in the cooking zone can be maintained in a range from about 300 deg. F to about 600 deg. F. The machine can further comprise a second cooking zone subsequent to the first cooking zone, wherein the second cooking zone can be maintained at a second cooking temperature for a defined period of time while the pressed flatbread dough piece is located in the second cooking zone. The second cooking temperature can be higher than the first cooking temperature of the first cooking zone. In one or more aspects of these embodiments, the machine can further comprise an actuation arm configured to transfer the pressed flatbread dough piece from the first cooking zone to the second cooking zone. The pressed flatbread dough piece can be transferred from the dough contacting surface of the lower platen to a cooking surface of a lower cooking platform, where the pressed flatbread dough piece is flipped over while being transferred to the cooking surface of the lower cooking platform. The second cooking zone can comprise a second heating element located below the lower cooking platform opposite the cooking surface, the second heating element configured to maintain the second cooking temperature while the pressed flatbread dough piece is located in the second cooking zone. The second cooking zone can comprise a radiant heating element positioned above the cooking surface of the lower cooking platform, the radiant heating element configured to apply radiant heat to the pressed flatbread dough piece in a range from about 750 deg. F to about 1000 deg. F.

In one or more aspects of these embodiments, the pressing platen can comprise an integrated heating element configured to preheat a pressing surface of the pressing platen prior to applying pressure to the dough piece. The pressed flatbread dough piece can have a thickness from about 0.1 mm to about 3.2 mm. The dough piecing assembly can comprise a shaped die through which the flatbread dough mixture is extruded, the dough piece having a shape corresponding to the shaped die. The pressed flatbread dough piece can be substantially triangular, square or rectangular in shape. In one or more aspects of these embodiments, the mixing assembly can comprise a mixing paddle located at the bottom of the mixing chamber of the hopper. The hopper can comprise a gate separating the mixing chamber of the hopper from an extrusion trough including a conveying screw configured to extruding the flatbread dough mixture for cutting by the cutting device. The gate can be released to facilitate transfer of the flatbread dough mixture to the extrusion trough after a specified rest period. In one or more aspects of these embodiments, the machine can further comprise a hopper lid configured to cover the mixing chamber of the hopper, the hopper lid including openings configured to allow a portion of the raw materials to be added to the mixing chamber during blending by the mixing assembly.

In another embodiment, a process of making a plurality of flatbread pieces includes adding bulk raw materials to a mixing chamber of a hopper of a flatbread machine and mixing the raw materials in the mixing chamber for a time period suitable to allow the raw materials to blend into a flatbread dough mixture, where the raw materials are mixed when a hopper lid is in a closed position over the mixing chamber and a user activates operation of the flatbread machine, The raw materials can comprise flour, water and oil and, optionally, salt, where each of the added raw materials are not engageably stored with the machine prior to addition of the raw materials to the hopper. The process further includes generating a dough piece by cutting an extruded portion of the flatbread dough mixture with a cutting device, the dough piece deposited on a dough contacting surface of a lower platen for pressing; pressing the dough piece with a pressing platen to form a pressed flatbread dough piece on the dough contacting surface of the lower platen, the pressing platen configured to apply suitable pressure to the dough piece to form the pressed flatbread dough piece with a specified thickness; transferring the pressed flatbread dough piece to a cooking zone on the dough contacting surface of the lower platen; and ejecting a cooked flatbread piece from the flatbread machine after cooking the pressed flatbread dough piece in the cooking zone. The dough contacting surface can comprise a substantially non-stick surface, and the cooking zone can comprise a heating element located below the lower platen opposite the dough contacting surface, the heating element configured to maintain a cooking temperature while the pressed flatbread dough piece is located in the cooking zone for a specified time period.

In one or more aspects of these embodiments, the process can further comprise transferring the pressed flatbread dough piece to a cooking surface of a lower cooking platform in a second cooking zone, where the pressed flatbread dough piece is flipped over while being transferred to the cooking surface of the lower cooking platform, and where the cooked flatbread piece is ejected from the flatbread machine after cooking the pressed flatbread dough piece in the second cooking zone. The process can further comprise heating the pressed flatbread dough piece on the cooking surface of the lower cooking platform with a radiant heating element positioned over the cooking surface prior to ejecting the cooked flatbread piece from the flatbread machine. The process can further comprise preheating a pressing surface of the pressing platen prior to pressing the dough piece on the dough contacting surface of the lower platen. The process can further comprise depositing at least one drop of oil or melted butter on the cooked flatbread piece before ejection from the flatbread machine.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
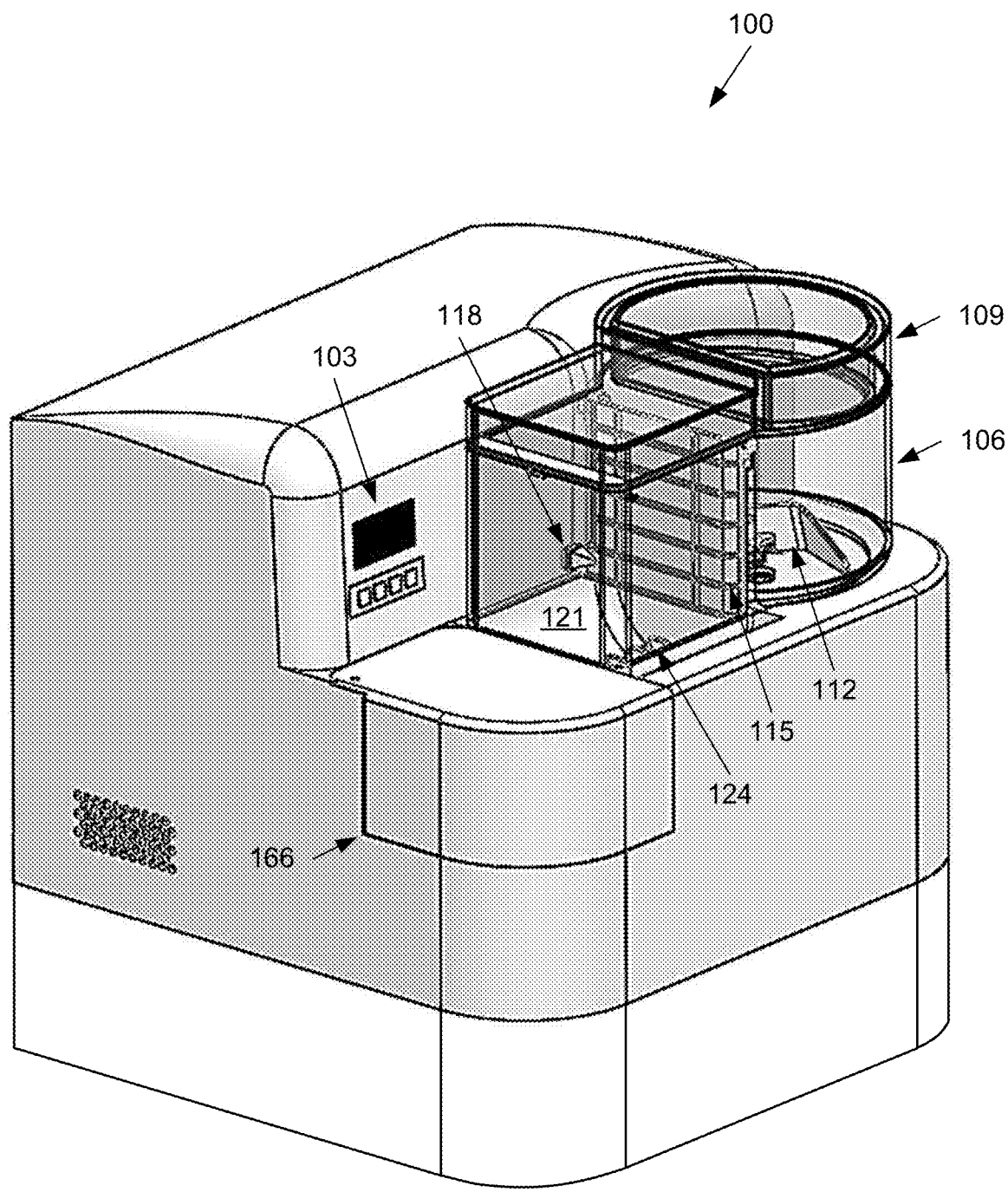
FIGS. 1A and 1B are perspective views of an example of a flatbread machine in accordance with various embodiments of the present disclosure.

Disclosed herein are various embodiments of methods related to systems, apparatus and methods for making flatbreads. A compact machine for making a plurality of flatbread pieces on demand in small batches is disclosed. Reference will now be made in detail to the description of the embodiments as illustrated in the drawings, wherein like reference numbers indicate like parts throughout the several views. While several implementations may be described in connection with the included drawings, there is no intent to limit the disclosure to the implementations disclosed herein. To the contrary, the intent is to cover all alternatives, modifications, and equivalents.

The term "substantially" is meant to permit deviations from the descriptive term that do not negatively impact the intended purpose. All descriptive terms used herein are implicitly understood to be modified by the word "substantially," even if the descriptive term is not explicitly modified by the word "substantially."

The term "flatbread" includes, as a non-exclusive list, roti, tortillas and other regional flatbreads that can suitably be made in accordance with the systems, apparatus and methods herein. In some aspects, the disclosed embodiments herein are not suitable for preparing doughs that include egg. Still further, in some aspects, the embodiments herein are not suitable for preparing doughs that include added yeast or other leavening ingredients and, as such, the raw materials used to prepare the flatbreads do not include added yeast, baking soda, baking powder or other leavening ingredients.

Figure 1B:
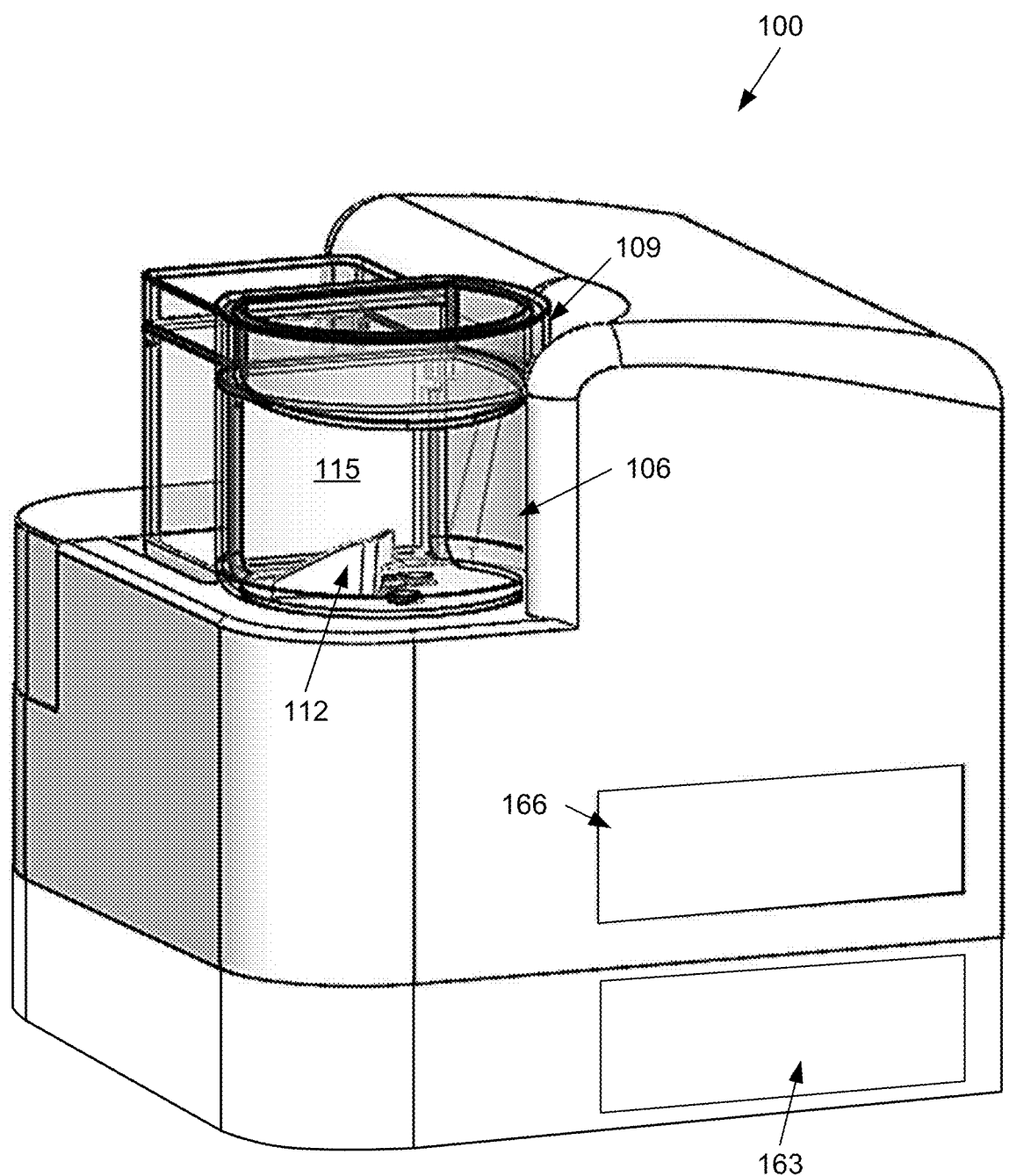

In one aspect, a compact machine can be used for making a plurality of flatbread pieces in a residential kitchen-type environment. Referring to FIGS. 1A and 1B, shown is an example of a self-contained flatbread machine 100 suitable for countertop or tabletop use that can prepare flatbread in small batches for consumption. Broadly, the flatbread machine 100 can include a series of stations or assemblies such as, e.g., a raw material addition station, a mixing station, a dough piecing station, a dough pressing station, at least one cooking zone, a flatbread ejection station and/or combinations thereof. Each of these stations or assemblies can be in operational communication with one or more other stations to allow a plurality of flatbread pieces to be prepared substantially automatically after a user provides the appropriate raw materials to the flatbread machine 100 and initiates operation of the production process. The flatbread machine 100 is configured to accept the raw materials in the quantities provided by a user, and to produce a batch of flatbread pieces through the automated machine process. A control panel or interface 103 can be used to control the operation of the flatbread machine 100 and provide status indications or message during the flatbread making process.

As shown in the example of FIGS. 1A and 1B, the flatbread machine 100 includes a hopper 106 having a mixing chamber into which the raw materials can be added. The hopper 106 can be part of a raw materials addition station, a mixing station, or a raw materials addition/mixing station. In the example of FIGS. 1A and 1B, a vertical hopper 106 is used with an opening at an upper end to receive the raw materials. The hopper 106 can have a size suitable for holding an appropriate amount of ingredients or raw materials typically needed for a single batch of flatbreads. For example, after turning on the unit, the user can select the desired operation of the flatbread machine 100 through control panel 103 and provide the appropriate types and quantities of raw materials to the hopper 106.

The user can provide the desired quantities of raw materials into the hopper 106 through the opening either directly (uncovered) or through a hopper lid 109. It is significant to note that the hopper 106 is not configured to operationally engage with a capsule in which flatbread dough is incorporated, as shown in the '340 publication. Still further, the hopper 106 is configured to include substantially all ingredients as provided in bulk by the user, as opposed to having individual charging containers as is shown in '221 patent. The hopper opening can be configured to allow all raw materials to be introduced into the mixing section in bulk, that is, substantially simultaneously. In some implementations, the hopper lid 109 can include one or more slots or holes that allow the raw materials (e.g., water and/or oil) to dribble into the hopper 106.

The flatbread machine 100 can be provided with a set of measuring cups that assist the user in creating differently sized flatbread batches, and therefore differing amounts of flatbread pieces per batch. In some aspects, the flatbread machine 100 can be configured with one or more storage bays that allow the measuring cups to be stored with the flatbread machine 100 when not in use. The hopper 106 can also be scored with markings to provide visual indications to the user as to the amount of raw materials to be used for various batch sizes.

The hopper 106 can be made of a food-grade plastic material such as, e.g., polyethylene, polycarbonate; an appropriate metal such as stainless steel or other suitable material. The hopper 106 can be removable from the body of the flatbread machine 100 to enable cleaning. In this regard, the hopper 106 can be communicatively coupled and removeably engaged with the framework and/or other components of the flatbread machine 100. Still further, variously-sized and removeably engaged hoppers 106 can be provided to allow the user to select a hopper size for a corresponding flatbread batch size. Such removeably engageable hoppers 106 can be configured for storage when not in use such as, e.g., by nesting or other appropriate fashion.

The batch size can be the number of flatbreads likely to be consumed in a single meal for a typical household. For instance, the hopper 106 can be of a suitable size to allow about 2 or about 4 or about 8 or about 10 or about 12 or about 16 or about 20 or about 24 or more flatbread pieces to be prepared from a single charging of raw materials into the hopper 106. The hopper 106 can have a capacity of about 1 cup or about 2 cups or about 3 cups or about 4 cups or larger, where any value can form the upper or lower endpoint in a range, as appropriate. Still further, the hopper 106 can be of suitable size to allow charging of about 1 cup to about 4 cups of flour. In general, about 1 cup of flour will make about 4 to about 6 rotis, whereas 4 cups of flour will make about 18 to about 22 rotis.

As previously mentioned, the hopper 106 can include a hopper lid 109 that allows the opening to be closed so as to reduce the possibility of dirt or other undesirable materials from entering the hopper 106 or other portions of the mixing station. The hopper lid 109 can include a "lock out" feature to prevent a user's fingers from getting caught in the flatbread machine 100 during mixing of the raw materials. The hopper lid 109 can have one or more opening(s) where the dry ingredients can be added to the larger opening. There can also be one or more smaller opening(s) for the addition of one or more liquid ingredient. In use, the raw materials are incorporated into the hopper 106 as desired by the user, and then mixed to form the dough to make the flatbread pieces. The raw materials can be mixed in the hopper 106 using a mixing apparatus configured to enable efficient mixing of the raw materials to prepare the flatbread dough such as, e.g., a mixing paddle, a single mixing screw, or array of mixing blades. As the raw materials are mixed, the liquid ingredients (e.g., oil and/or water) can be slowly added to the mixing chamber by trickling through the smaller opening(s) of the hopper lid 112. This process closely simulates hand mixing of the dough were water is added little by little to form the dough ball. The mixing apparatus can be configured for removal from with the hopper 106 to allow for cleaning and/or replacement.

In the example of FIGS. 1A and 1B, the raw materials are mixed using a mixing paddle 112 located at the bottom of the hopper 106. The operation of the mixing paddle 112 can be controlled through a drive unit (e.g., a stepper motor) located in the flatbread mixer 100 below the hopper 106. For example, the mixing paddle 112 can be detachably attached to a shaft of the drive unit that extends through the bottom of the hopper 106. The vertical configuration of the hopper 106 allows the flatbread dough to be mixed to the desired consistency. To better ensure that the raw materials do not become overly heated during the mixing operation, the mixing paddle 112 can be fabricated from a suitable plastic material.

In some embodiments, the flatbread machine 100 can be configured to monitor the amount of raw materials added to the hopper 106. This can be accomplished using sensors (e.g., optical, load, or ultrasonic sensors) that can be used to determine if a minimum amount of raw materials has been added to the mixing chamber (e.g., by height, weight, or volume) to allow the flatbread making process to begin. For example, if the user pushes the ON/OFF switch, the flatbread machine 100 will not begin mixing the raw materials unless there is at least a threshold amount of ingredients (e.g., about ½, ¾ or 1 cup of flour) in the hopper 106.

The user can start the mixing process once the raw materials are added to the hopper 106 through the control panel 103 or an ON/OFF switch. As previously discussed, the hopper lid can be configured with a "lock out" mechanism that prevents operation of the mixing apparatus unless the hopper lid 112 is closed and fully engaged. This can reduce the likelihood of a user injury. In some cases, liquid ingredients can be added to the hopper 106 though the hopper lid 112 as the mixing is taking place. The mixing station can also include a braking mechanism and/or an emergency shutoff switch to immediately stop the mixing apparatus, if needed.

Once the desired amount of wet and dry raw materials are added to the hopper 106, the raw materials can be mixed into an appropriate dough configuration for cutting, pressing and, later, cooking. The hopper 106 and/or hopper lid 109 can be made of transparent material allowing the user to see the batch of dough being mixed. If desired, the user can add additional ingredients (e.g., more flour or oil or water) to change the consistency of the mixed dough to their liking. The mixing station can operate continuously and run until all or substantially all the raw materials are mixed into dough. A timer can be used to control the mixing time of the raw materials. For example, a timer can be incorporated into the drive control circuitry of the drive unit for the mixing paddle 112 to control the duration of mixing. In other implementations, the timer can be included in other control circuitry and provide a control signal to the drive control circuitry to start, stop or adjust the duration of the mixing. The timer can also be in operational communication with other electronic controls of the machine. For instance, the control panel 103 can provide an indication of mixing time based upon a signal from the timer. After mixing is complete, the resulting dough ball may be allowed to rest for a short duration of time (e.g., about 15 minutes) in the mixing chamber before moving the flatbread dough to the dough piecing station. Such resting of the dough can help make the flatbread softer and taste better.

The option to allow the dough ball to rest may be selected by the user through the control panel 103.

As illustrated in FIGS. 1A and 1B, one side of the hopper 106 includes an opening between the mixing chamber and the dough piecing station. The opening is sealed by a gate 115 that defines one side of the hopper 106 when closed. The gate 115 is configured to open when mixing is complete, or after the rest time, to allow the dough ball to be transferred to the dough piecing station. During the mixing process, the gate 115 can be held in the closed position using a latch mechanism 118 such as, e.g., a solenoid controlled pin. To open the gate 115, the latch mechanism 118 can be released (e.g., by retracting the pin) and the gate can pivot upward to provide a clear path to the piecing station. The gate 115 can be spring loaded to assist in opening, or can be opened using, e.g., a motor drive or a solenoid. With the gate 115 in the open position, the dough can be moved from the mixing chamber to the dough piecing station by rotating the mixing paddle 112. After the flatbread making process is complete, the gate 115 can optionally be returned to the closed position with the latch mechanism holding it in place.

In the example of FIGS. 1A and 1B, the dough piecing station includes a horizontal trough 121 and auger or conveying screw 124 that are configured to guide the flatbread dough to an outlet where the dough is extruded and cut into appropriately sized pieces. The trough 121 can be enclosed by sidewalls and a cover to reduce the possibility of dirt or other undesirable materials from entering the trough 121 or other portions of the piecing station. As shown in FIGS. 1A and 1B, sidewalls can extend on opposite sides of the gate 115 to help guide the mixed dough into the trough 121. The sidewalls can be integrated as part of the hopper 106 and the hopper lid 109 can be extended to cover the trough 121 and auger or conveying screw 124.

Rotation of the auger or conveying screw 124 advances the dough ejected from the hopper 106 along the length of the trough 121. When the appropriate length of dough is provided at the outlet, such as can be measured by an advance of dough along a length of the auger or conveying screw 124, a portion of dough will be cut to an appropriate size by a blade to provide a portion control aspect for the flatbread. The dough piecing station is operationally engaged to a drive unit to allow the dough to be cut into a piece for cooking, where the cut length corresponds to an amount of cut dough suitable to provide an uncooked flatbread dough suitable for cooking after pressing as described further herein.

Figure 2A:
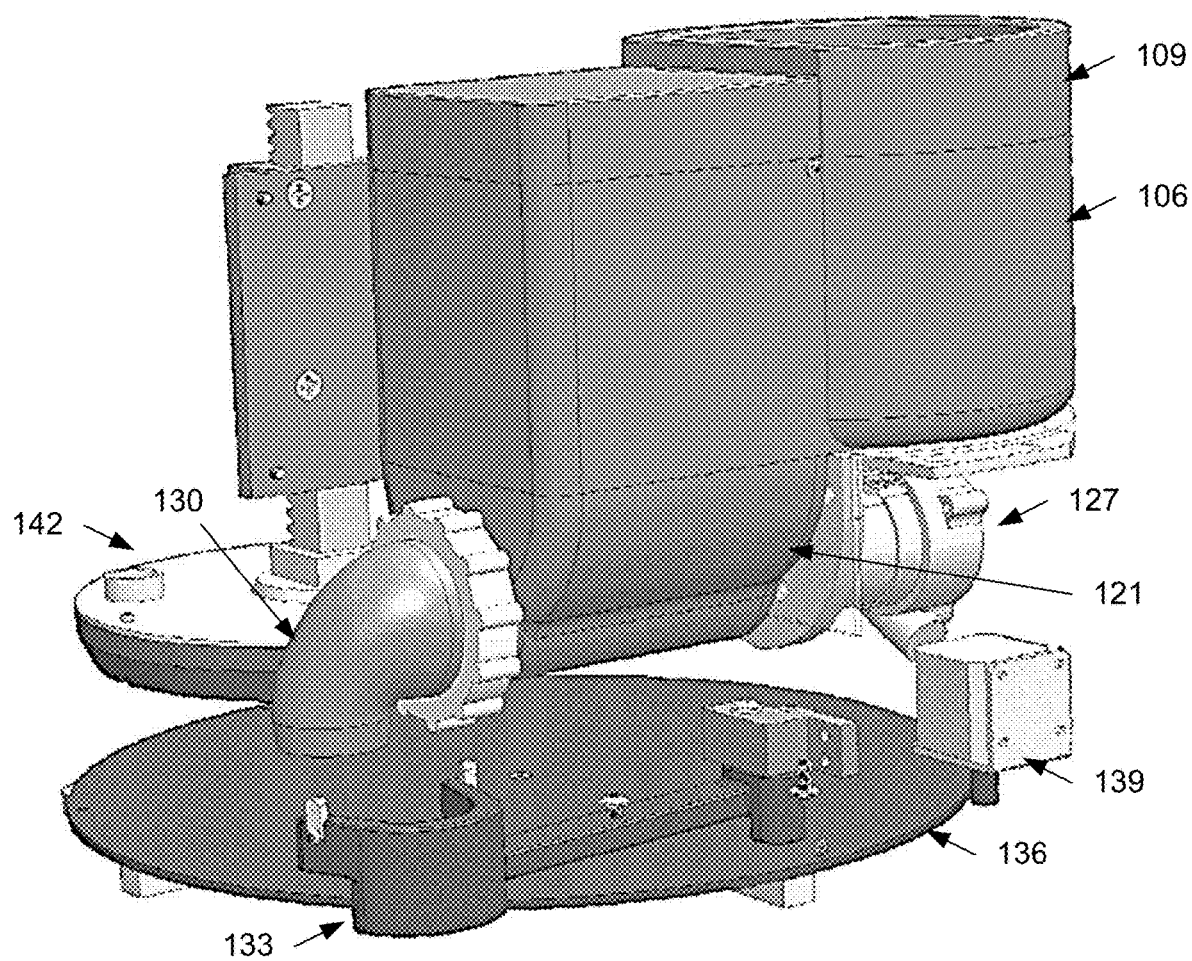
FIGS. 2A-2D are perspective and top views illustrating an example of the component arrangement within the flatbread machine of FIGS. 1A and 1B in accordance with various embodiments of the present disclosure.
Figure 2B:
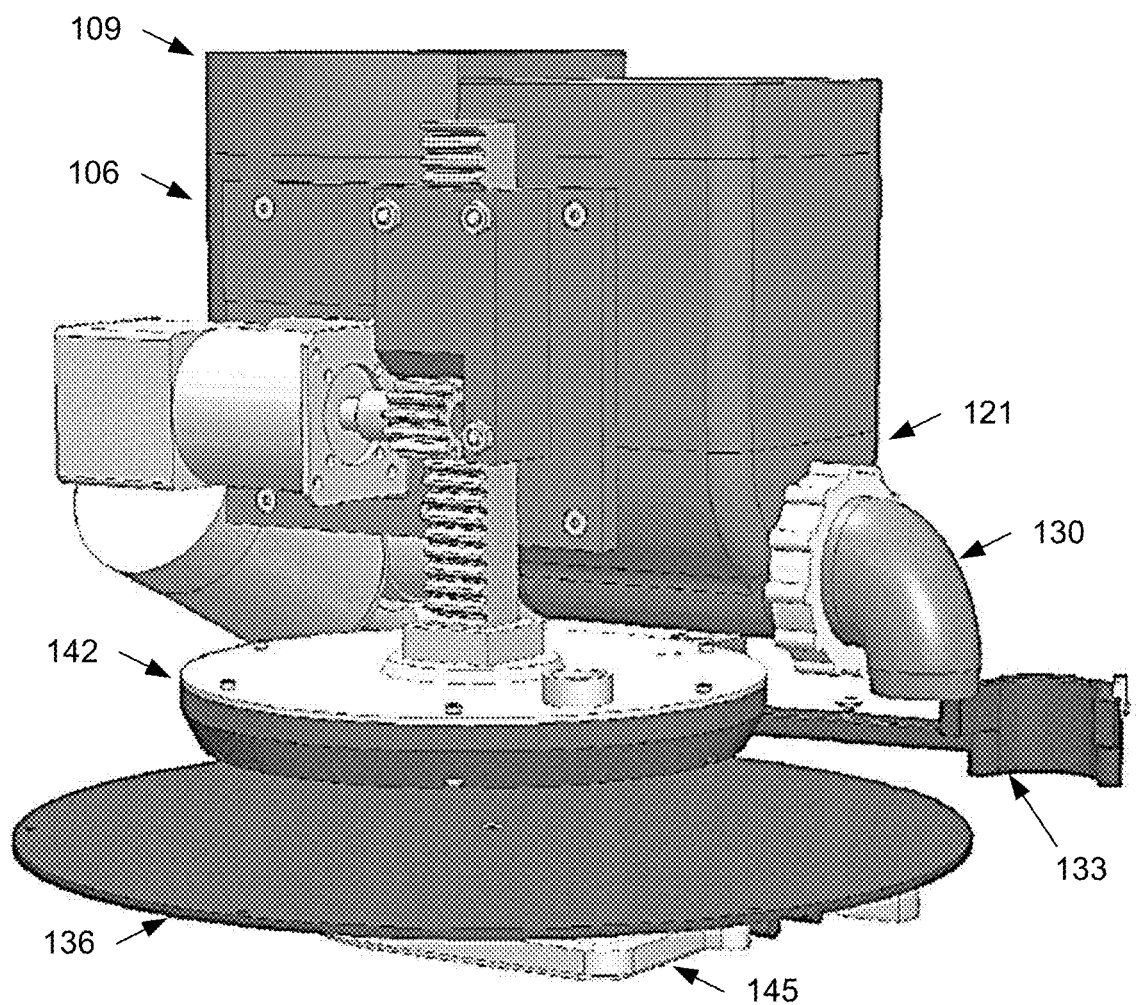
Figure 2C:
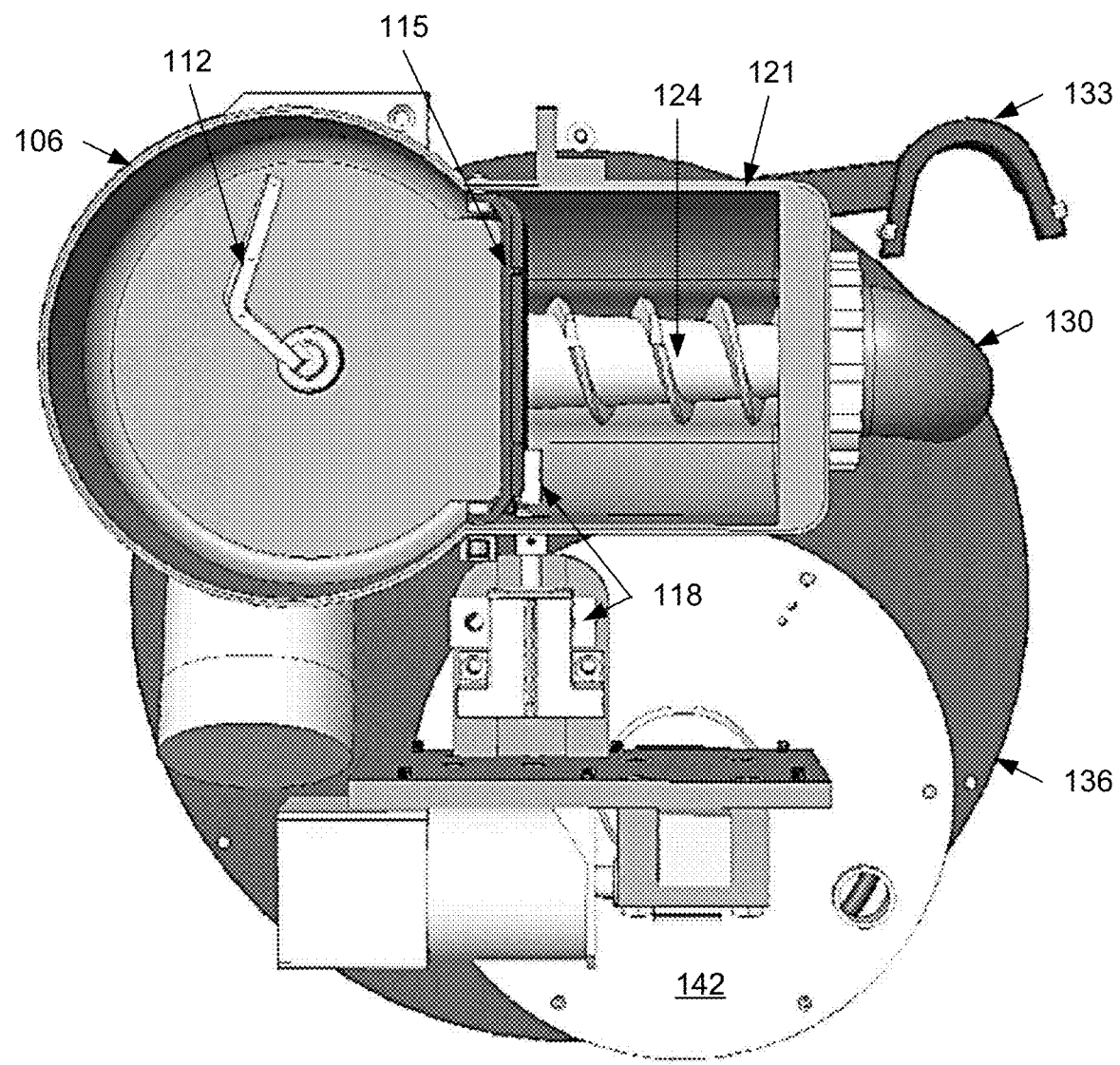
Figure 2D:
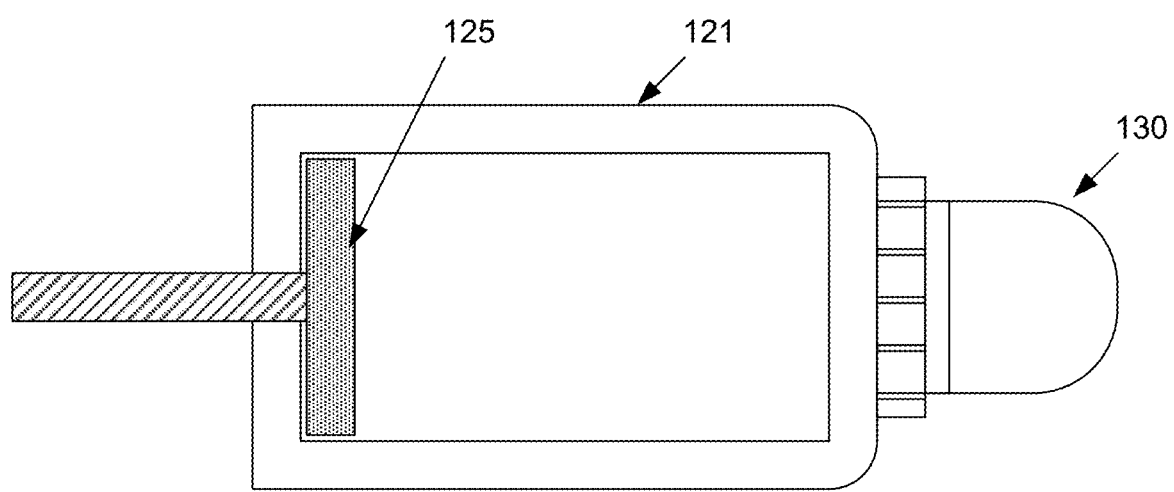

Referring next to FIGS. 2A-2D, shown are perspective and top views illustrating an example of the component arrangement within the flatbread machine 100. The drive unit 127 can be located at a first end of the trough 121, below the hopper 106, and the outlet 130 can be located at a second end of the trough 121 as illustrated. The drive unit 127 can include a drive motor (e.g., a stepper motor) and gearing configured to detachably engage the auger or conveying screw 124 through the first end of the trough 121. The advance of the thoroughly mixed uncooked flatbread dough as directed by the auger or conveying screw 124 generally provides enough force to extrude the dough through the outlet 130. In the example of FIGS. 2A-2C, the outlet 130 includes an elbow to direct the dough extruded by the auger or conveying screw 124 in a desired direction. When approximately the appropriate amount of dough is extruded through the outlet 130, a cutting device 133 engages with the extruded dough, either from a side or above or below the dough, to cut the dough piece. In the example of FIGS. 2A-2C, the cutting device 133 includes a pusher arm having a concave end configured to pass across the elbow opening to cut the dough piece from the extruded dough and position the dough piece on a lower platen 136 for pressing and cooking. The lower platen 136 can be an indexing platform that can be rotated or repositioned to transport the dough pieces between pressing and cooking zones. In some embodiments, the lower platen 136 can be a stationary platform and the dough pieces can be moved between the different zones using an external mechanism such as, e.g., a rotating arm. While FIGS. 2A-2C illustrate using an auger or conveying screw 124 to extrude the mixed flatbread dough from the outlet 130 of the trough 121, other extrusion arrangements can also be used. For example, FIG. 2D shows a top view of the extrusion trough 121 including a plunger 125 that can be advanced along the length of the trough 121. The advance of the thoroughly mixed uncooked flatbread dough as directed by the plunger 125 generally provides enough force to extrude the dough through the outlet 130.

While the example of FIGS. 2A-2C utilizes an elbow and pusher arm to cut the dough, other configurations can also be utilized to cut the flatbread pieces at the outlet 130 of the dough piecing station. For example, the dough can be horizontally extruded from the outlet 130 of the trough 121 (without the use of an elbow) and cut into appropriate sized pieces by a vertical or horizontal cutting blade or wire. A gravity-based guide path (e.g., a sloped ramp with sides or tube) can be located below the outlet 130 to direct the severed piece of dough to the appropriate position on the lower platen 136 for pressing and cooking. In some embodiments, a die, through which the dough can be extruded in a defined shape, can be included at the outlet 130 of the trough 121. In some aspects, the die may be a circle which is most common shape of the flatbread. But in other aspects, the shape may be a triangle, square, rectangle, star or other appropriate shape as desired. The user can use a die of their choosing, allowing the flatbread machine 100 to make breads in a variety of shapes as desired by the user.

As discussed above, the piece of flatbread dough can be directed onto the lower platen 136 by the cutting device 133 or by other appropriate positioning mechanisms such as, e.g., a guide path and/or an actuating arm that can reposition the piece of dough on the surface of the lower platen 136. In the example of FIGS. 2A-2C, the lower platen 136 is a rotating indexing platform that is used to transport the flatbread dough between the pressing station and cooking zones. The lower platen 136 can be made from metal, ceramic, or other appropriate cooking surface material, and the dough facing surface of the lower platen 136 can include a non-stick surface (e.g., ceramic coated, Teflon® coated or treated with another suitable coating) to facilitate movement of the flatbread on and off the surface. Where the lower platen 136 is a stationary platform, the non-stick surface can also aid in movement of the dough pieces on the lower platen 136 by the external mechanism. In other implementations, the lower platen 136 can be a conveyor belt or other linear or rotational assembly configured to facilitate movement of the flatbread dough between the pressing station and cooking zones. The indexing platform or the external mechanism can be driven using a motor or other controlled drive unit 139. As shown in FIG. 2A, a stepper motor 139 can be engaged with an edge of the indexing platform and used to control rotation of the surface.

The pressing station includes a pressing arm or platen 142 that is engageable with the dough piece situated on the lower platen 136 to flatten the dough into a pre-cooked flatbread piece. After cutting, the dough piece can be positioned approximately in the center location of the pressing platen 142, a location that will result in the pressed flatbread dough being pressed approximately outwardly from the center of the pressing platen 142. This can be accomplished using, e.g., the cutting device to move the severed dough piece to the appropriate position on the lower platen 136. For example, the indexing platform or external mechanism can then be moved to position the dough piece at the appropriate location below the pressing platen 142. The pressing platen 142 can then be moved downward to press the dough against the lower platen 136, which will result in the uncooked pressed flatbread dough to be approximately circular or other shape based upon the die through which the dough was extruded. For example, a square-shaped dough piece can result in somewhat square shaped flatbread. The pressing platen 142 can have a circular or other appropriately shaped (e.g., square or rectangular) pressing surface. In some embodiments, the pressing platen 142 can be from about 5 inches to about 9 inches, or about 6 inches to about 8 inches, in diameter. The size of the pressing platen 142 can correspond generally to the resulting diameter or size of the flatbread when the cut dough piece is pressed generally from a center location of the pressing platen 142. In some embodiments, the pressing platen 142 may be stationary and the lower platen 136 may move against the pressing platen 142 to flatten the dough piece into a pressed flatbread piece.

The pressing platen 142 can be operationally engaged with a rack and pinion mechanism that is itself operationally engaged with a motor that is configurable to allow the platen to perform the pressing step. For example, a stepper motor can be used to control the vertical movement of the pressing platen 142. The pressing platen 142 can also be operationally engaged with a hydraulic press or other mechanical device (e.g., a rack and pinion type device or a linear motor type device) to provide the pressing force to flatten the dough. Such pressing platen 142 and any equipment associated therewith will suitably control the force applied by the platen 142 or the distance that the platen 142 travels, either or both of which can be utilized to provide suitable dough thickness. In this way, different flatbread thicknesses can be provided by the flatbread machine 100. In use, the mechanical aspects of the pressing station are configurable to provide the amount of pressure appropriate to provide a pre-cooked flatbread piece having a thickness suitable to make flatbread such as roti, tortillas etc. The pressing thickness may be controlled to press the dough piece to the appropriate thickness for cooking as specified by the user through the control panel 103 (FIG. 1A). In this regard, after flattening and prior to cooking, the dough piece can be flattened to a thickness of from about 0.1 mm to about 3.2 mm, from about 0.2 mm to about 1.5 mm, or from about 0.3 mm to about 0.8 mm.

The pressing platen 142 can include a warming feature, such as heating elements located internally therein, radiating outwardly to a dough facing surface of the platen 142. At least the dough facing surface of the pressing arm or platen 142 can comprise a non-stick surface. In separate examples, the dough facing surface can be ceramic, Teflon® coated or coated with another suitable coating. In addition to the heating element in the pressing platen 142, a lower heating element 145 can be located below the lower platen 136 aligned with the pressing platen 142. Preheating the pressing platen 142 and the lower platen 136 using the lower heating element 145 before the dough piece is pressed can improve the flattening. For instance, preheating of the platen 142, in addition to the other heating elements in the flatbread machine 100, can be initiated when mixing of the raw materials begins. The surface temperature of the pressing platen 142 can be preheated to a range from about 325 deg. F to about 525 deg. F, or from about 350 deg. F to about 475 deg. F, or from about 370 deg. F to about 425 deg. F. After the pressing is complete, the pressed dough can be moved by or on the lower platen 136 to a cooking zone (e.g., by rotating the lower platen or moving the pressed dough using an external mechanism such as, e.g., an actuation arm).

As the indexing platform is rotated, the pressed flatbread dough exits the pressing station, and moves into one or more cooking zone(s). The use of a rotating indexing platform provides a substantially continuous cooking station, which can improve the operation of the cooking process. The lower platen 136 comprises a surface material that has a coefficient of friction that both allows the flatbread dough to be cooked appropriately, and to be easily removable when cooked. Moreover, the surface of the lower platen 136 should have a heat transfer coefficient that allows heat to be transferred appropriately from one or more heating elements to the flatbread dough. In this regard, the lower platen 136 can comprise a ceramic coated material, which is both relatively non-stick and has a suitable heat transfer profile.

Generally, the flatbread can be cooked by a combination of direct (contact) heating through the lower platen 136 (e.g., via heating elements below the cooking surface) and/or via radiant heat from heating elements above the flatbread. This process allows both sides of the flatbread to be fully cooked. Conductive heating elements below the lower platen 136 can be configured to provide a cooking temperature for the dough facing surface of the lower platen 136 from about 250 deg. F to about 1000 deg. F, or from about 400 deg. F to about 975 deg. F, or from about 500 deg. F to about 940 deg. F. A lower surface of the lower platen 136 can be fully or partially enclosed within the housing of the flatbread machine 100 to prevent the user from coming in contact with the heated surface of the platform. The machine housing can be insulated to reduce heat transfer to the exterior of the flatbread machine 100. Insulation can also be provided between the different zones to allow for different operating temperatures and to redirect heat to the cooking zone by way of radiant heat. Transfer of radiant heat throughout the cooking station can be facilitated by a fan that is configured to improve circulation of the heat within a cooking zone, and heat can be vented out of the flatbread machine 109 through, e.g., ventilation openings as shown in FIG. 1A.

Figure 3:
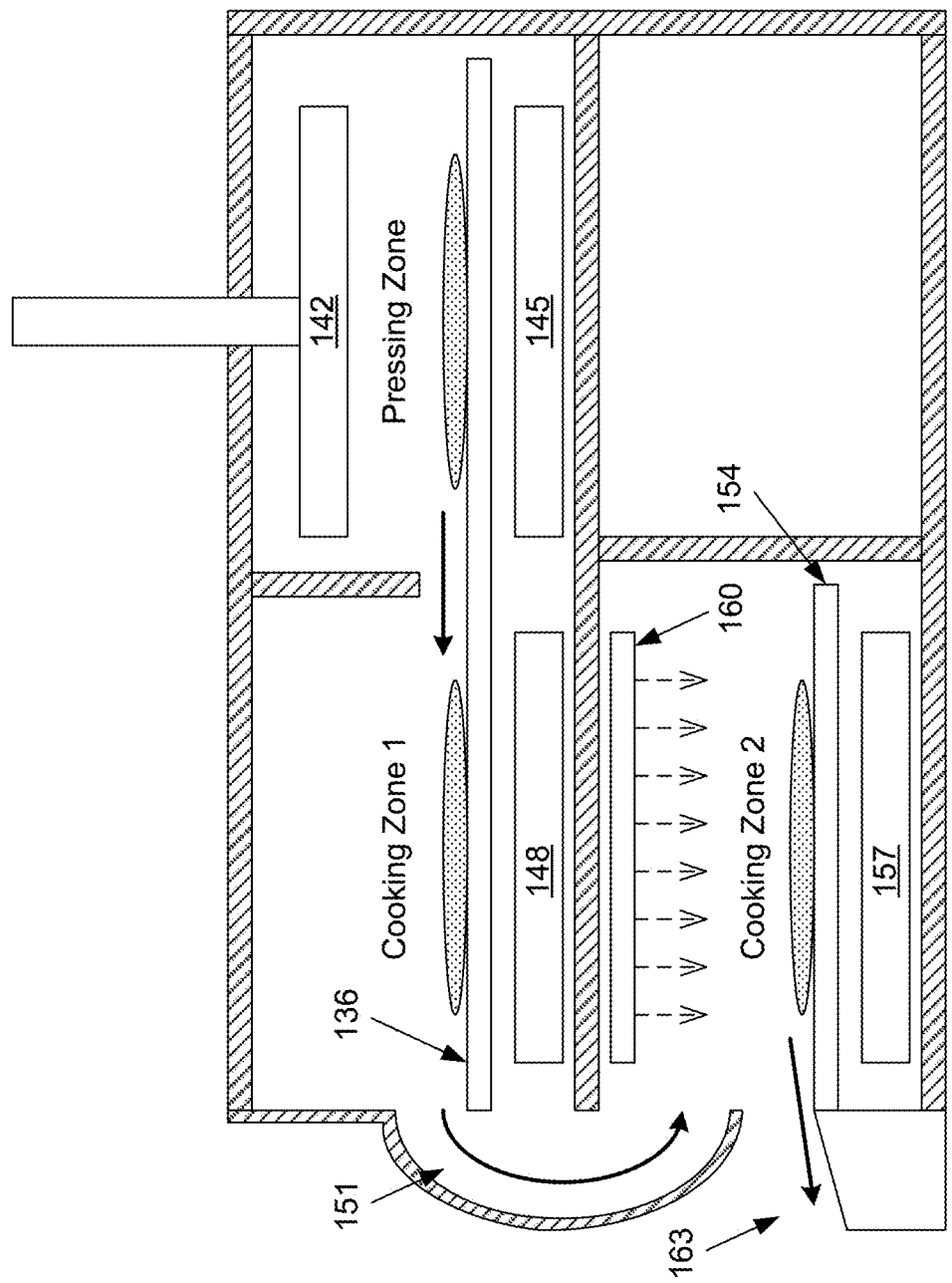
FIG. 3 is a graphical representation illustrating an example of pressing and cooking zones with the flatbread machine of FIGS. 1A and 1B in accordance with various embodiments of the present disclosure.

There can be one or more cooking zone(s) in the cooking station. Referring to FIG. 3, shown is a graphical representation illustrating an example of the relationship between the pressing and cooking zones of the flatbread machine 100. In this example, there are two cooking zones in the cooking station where different heating profiles are provided to allow the flatbread to be subjected to different temperatures during the cooking process. After the flatbread dough is initially pressed to the desired thickness by the heated pressing platen 142, the flatbread can be transferred by or on the lower platen 136 to a first cooling zone, where a second lower heater 148 can apply heat to a first surface of the pressed flatbread through the lower platen 136. For example, the heaters can be used to heat the dough in a temperature range from about 300 deg. F to about 600 deg. F, or from about 400 deg. F to about 500 deg. F for about 2 seconds to about 30 seconds, or from about 3 seconds to about 20 seconds.

The indexing platform or the external mechanism can be configured to move/rotate substantially continuously. Yet further, the indexing platform can be configured to stop one or more times during the flatbread process to allow the pressed flatbread dough to be subjected to heating in the cooking zone for a time longer than if the indexing platform was moving substantially continually. In some implementations, the indexing platform can be configured to stop or slow in cooking zone one so that the pressed flatbread piece is subjected to heating in that zone for a longer period, for example about 10 to about 90 seconds. In this regard, the flatbread dough piece can bake substantially to completion in cooking zone 1. When the pressed flatbread dough piece has baked for the specified period of time, the indexing platform or external mechanism can begin to move/rotate again and the flatbread can enter a second cooking zone that is maintained at a similar or higher temperature than cooking zone 1.

In the example of FIG. 3, the flatbread piece is removed from cooking zone 1 and sent to cooking zone 2. This can be accomplished using an actuation arm configured to push the flatbread piece off of the lower platen 136, where it passes downward through a channel 151 that flips the flatbread piece before landing on a lower cooking platform 154. The lower cooking platform 154 can be constructed in the same fashion as the lower platen 136 with a non-stick surface to facilitate movement of the flatbread on and off the surface. A third lower heater 157 can apply heat to a second surface of the flatbread through the lower cooking platform 154. The temperature of cooking zone 2 can be from about 400 deg. F to about 600 deg. F, and can be applied for about 5 seconds to about 40 seconds. The substantially cooked flatbread dough piece can be puffed and or browned in this higher temperature cooking zone 2.

The flatbread can also be cooked via radiant heat from a radiant heating element 160 situated above the flatbread in the cooking zone 2. Such radiant heat can be generated by, for example, resistive heating elements 160. Transfer of radiant heat throughout the cooking zone can be facilitated by a fan that is configured to improve circulation within the cooking zone. The radiant heating can apply heat in a range from about 750 deg. F to about 1000 deg. F for about 5 seconds to about 30 seconds. The application of the radiant heat can ensure that the first side of the flatbread is evenly toasted.

When the cooking cycle is completed, that is, when the flatbread dough piece leaves one or more cooking zones, which is timed according to the speed of the indexing platform (or external mechanism) and temperature applied in the different cooking zones of the flatbread machine 100, the fully cooked flatbread enters an ejection zone where it is pushed or "kicked" off the lower cooking platform 157 by an arm or spatula for collection, such as onto a plate or into a basket. The surface of the lower cooking platform 157 is suitably non-stick to allow the flatbread to be easily removed from the cooking surface. The cooked flatbread piece can be provided to the user through an exit door 163, such as the closed door 163 shown in FIG. 1B.

In some embodiments, the flatbread machine 100 can be configured to deposit one or more drops of oil or melted butter onto the finished flatbread piece before it is ejected from the machine. The flatbread machine 100 can include a reservoir configured to hold oil or clarified butter. The oil or butter may be warmed in the reservoir to aid in dispensing the liquid on the flatbread pieces. A dispensing valve can be used to drip or spray the oil or butter on the flatbread.

Those parts of the flatbread machine 100 that touch the raw materials and flatbread dough are readily cleanable. In this regard, at least the hopper 106, hopper lid 109, trough 121, auger or conveying screw 124, extrusion outlet 130, extrusion plate or die, cutting device 133 can be independently removed from the flatbread machine 100 for cleaning and reassembly. The lower platen 136 and/or lower cooking platform 154 can be accessed through one or more covered openings 163 and/or 166 in the flatbread machine 100 to allow thorough cleaning when desired. When cleaning the lower platen 136, the user can engage a switch that can allow the platform to rotate freely to allow all of the platform surface to be cleaned. The pressing platen 142 can also be accessible for cleaning. The user may clean the pressing platen 142 and the lower platen 136 through a special door opening that allows for wiping clean the surfaces. This can be done when the flatbread machine 100 is not in operation and all surfaces of the machine, including the internal surfaces, are at room temperature. Any piece of the flatbread machine 100 that is removable for cleaning should be dishwasher safe. The electronics are sealed so that water damage does not occur during cleaning.

Figure 4:
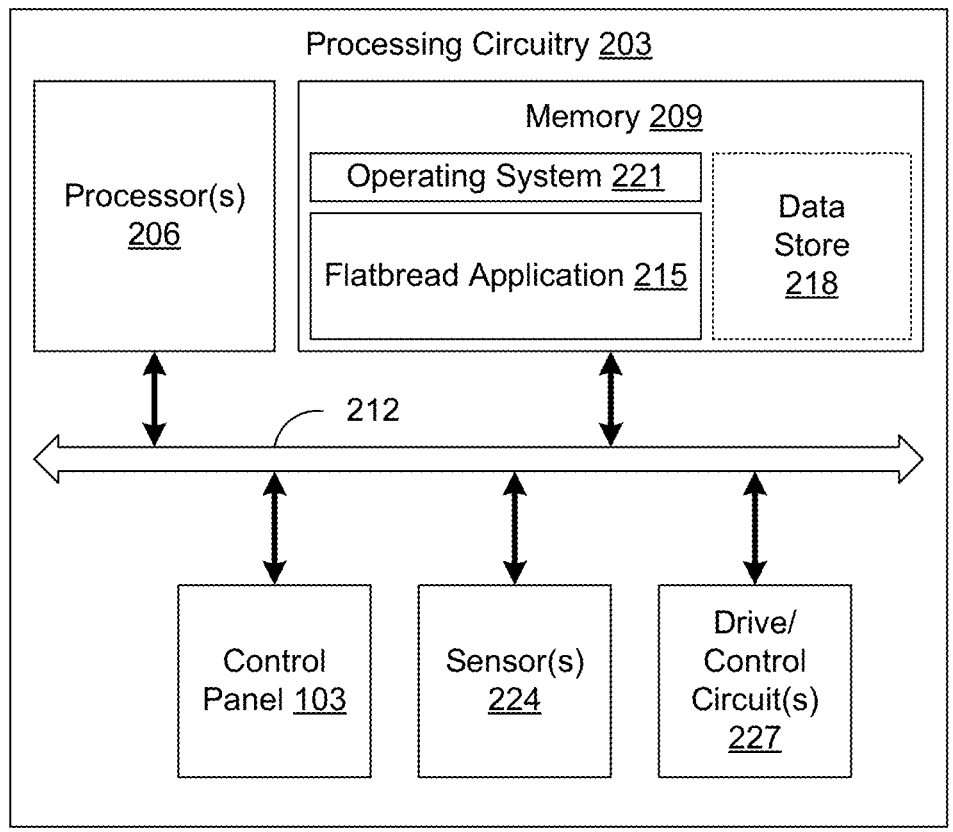
FIG. 4 is a schematic diagram illustrating an example of processing circuitry within the flatbread machine of FIGS. 1A and 1B in accordance with various embodiments of the present disclosure.

The flatbread machine 100 can include at least one control panel 103 (FIG. 1A) for user operation. The control panel 103 provides a user interface with a control system of the flatbread machine 100. The control panel 103 can interact with processing circuitry configured to control the flatbread making process. Referring to FIG. 4, shown is an example of processing circuitry 203 that can be utilized in a flatbread machine 100. The processing circuitry 203 can include at least one processor circuit, for example, having a processor 206 and a memory 209, both of which are coupled to a local interface 212. The local interface 212 may comprise, for example, a data bus with an accompanying address/control bus or other bus structure as can be appreciated. Stored in the memory 209 are both data and several components that are executable by the processor 206. In particular, stored in the memory 209 and executable by the processor 206 are flatbread application 215 and potentially other applications.

Also stored in the memory 209 may be a data store 218 and other data. The data stored in the data store 218, for example, is associated with the operation of the flatbread machine. For example, the data store 218 can include flatbread recipes, operational parameters, user preference setting parameters, and other data or information as can be understood. In addition, an operating system 221 may be stored in the memory 209 and executable by the processor 206. The processing circuitry 203 can monitor the system conditions through one or more sensor(s) 224 (e.g., temperature sensor(s), proximity sensor(s), displacement sensor(s), pressure/force sensor(s), etc.) and provide control signals to various drive and/or control circuitry 227 as has been described.

The processing circuitry 203 can interface with a user of the flatbread machine through the control panel 103 to accept inputs and provide outputs of the flatbread machine. To this end, the control panel 103 can comprise a display configured to indicate, e.g., system status and/or prompt for user inputs. The control panel 103 can also include one or more buttons or keypad to communicate with the user. The control panel 103 can be configured to allow for various operational inputs and outputs such as, but not limited to, power ON/OFF, start/stop, "cycle finished," audible signals, batch size (e.g., 1 cup, 2 cups, 3 cups, etc. and/or number of flatbread pieces and, in some aspects, desired thickness of the pieces. A separate power switch can be located at another location on the flatbread machine 100 to isolate the power supply from the other circuitry in the flatbread maker 100.

The processing circuitry can also be configured to allow the flatbread machine 100 to communicate with an external device though a communication link or other network connection. For example, the flatbread machine can come with a smartphone app that connects to the machine via Bluetooth®, WiFi, or other appropriate communication link. The smartphone app can allow the user to control several aspects of the flatbread making process such as, but not limited to, the selection of the flatbread recipe, flatbread thickness, the cooking temperature(s), etc. With this, a user can define their own custom flatbread recipes, and get it right every single time with users choice of ingredients. They can even use the app with other flatbread machines 100 when visiting friends, for example. This enables users to carry their favorite recipes in their smart phone and make flatbreads at home, at the office or at a friend's house. The app can also allow the user to access new flatbread recipes that can be used with the flatbread machine 100, and/or share or trade recipes with other users. The ability to communicate through the communication link or network connection also allows for downloading and/or updating the flatbread machine firmware and/or software (e.g., through the smartphone app), and upload and/or transfer machine diagnostic data to support resources such as a website.

The control panel 103 can allow the user to select one or more flatbread recipe(s) for preparation by the flatbread machine 100. For example, the user can select one of a variety of flatbread recipes (e.g., roti, tortilla, etc.) through the control panel 103, or can enter or modify recipes as desired. The raw materials used to produce the flatbread will depend on the type being made. For example, atta flour can be used to make roti, while white, yellow and/or blue corn flour can be used for corn tortillas and wheat flour can be used for flour tortillas. An example of a typical roti recipe includes:

3 cups of chapatti flour (also known as durum wheat atta) or 1½ cups whole wheat flour+1½ cups all-purpose flour;
  1 tablespoon ghee (clarified butter) or oil;
  1-1½ cups warm water; and
  (optionally) ½-1 teaspoons salt.

Rice flour or gluten free flour (e.g., a lentil flour mix) can be used to make gluten free roti, and other roti types can be prepared without oil/ghee. The flexibility and versatility of the flatbread machine 100 makes it capable of handling a wide range of raw materials, making it capable of accommodating an extensive variety of common and less common flatbread recipes.

An example of a typical corn tortilla recipe includes:
  Corn flour (e.g., 46+/−5% dried nixtamalized corn flour, moisture 13%+/−2%);
  Water: 54+/−5% (warm temperature); and
  Additives<2% salt or other materials.

Dry or liquid flavorings can be added for incorporation in the mixed dough, if desired. For example, spice or other flavor packet mixes can be added to the dry mix of ingredients to make spicy or sweet flatbreads. Jalapeno oil or pieces can be added to make spicy tortillas, for example. Other ingredients may also be used to make other types of flatbreads. For example, raw and chopped vegetables such as, e.g., fenugreek leaves, spinach, pre-cooked and mashed vegetables such as green peas, potatoes, yams, etc. can be added to make special (or designer) flatbreads.

Figure 5:
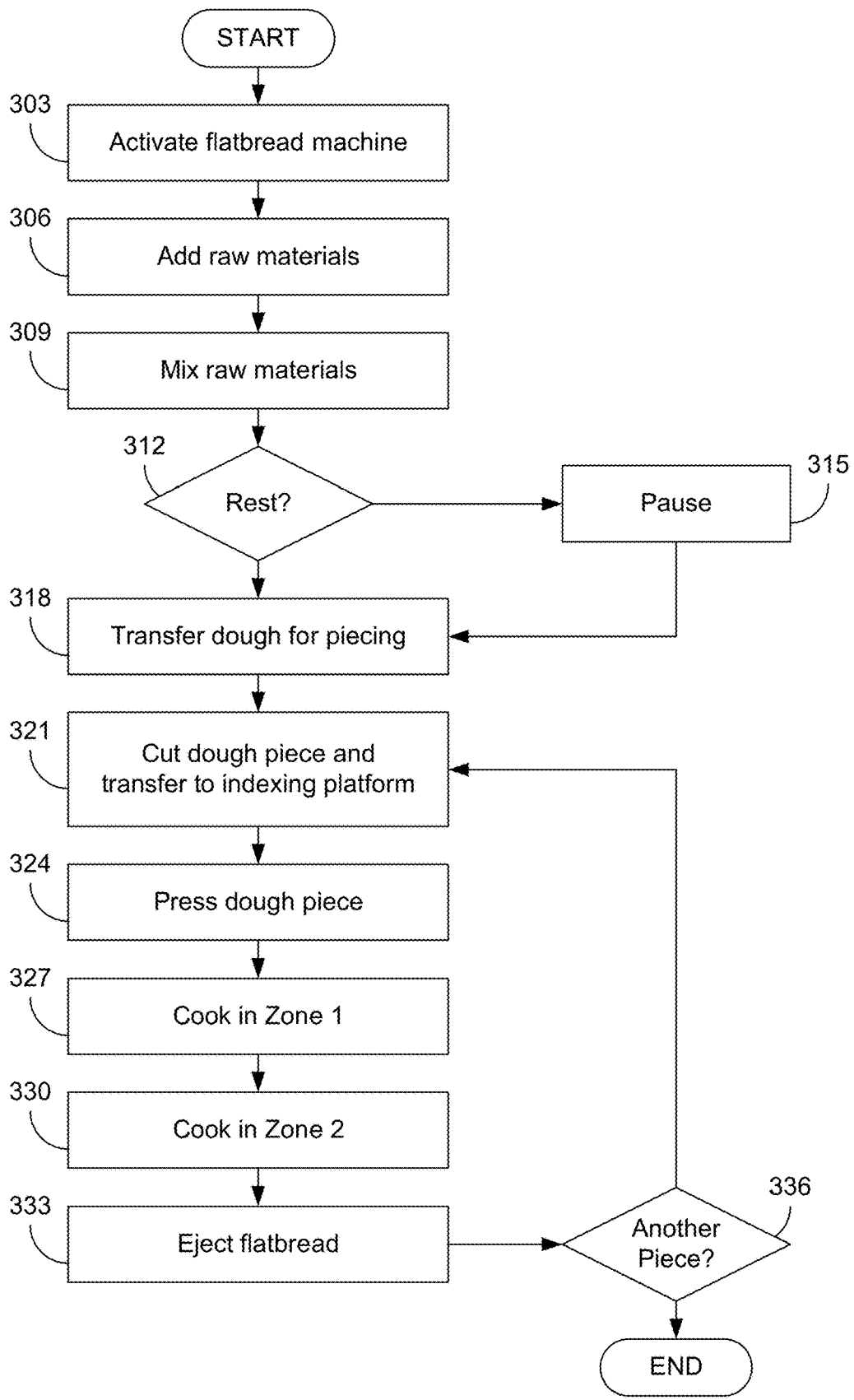
FIG. 5 is a flowchart illustrating an example of a flatbread making process utilizing the flatbread machine of FIGS. 1A and 1B in accordance with various embodiments of the present disclosure.

Referring to FIG. 5, shown in a flowchart illustrating an example of the flatbread making process using the flatbread machine 100 of FIGS. 1A and 1B. Beginning at 303, the flatbread machine 100 can be activated by a user through the control panel 103 (FIG. 1A) and/or an ON/OFF switch. In some implementations, the user can select a flatbread recipe for preparation by the flatbread machine 100. The user can also specify serving size, which can be used by the flatbread machine 100 to specify quantities of raw materials needed to prepare the flatbread pieces. Activation of the flatbread machine 100, can also initiate operation of the heating elements to preheat the pressing platen 142 and the cooking zones in preparation for cooking the flatbread pieces.

At 306, the user adds the bulk raw materials (e.g., flour, water, oil, etc.) into the hopper 106 (FIGS. 1A-1B) in the appropriate amounts. In some cases, a portion of the raw materials can be added directly to the hopper 106, and then a remaining portion of the raw materials can be added through the hopper lid 109 (FIGS. 1A and 1B). For example, liquid ingredients can be dribbled into the hopper 106 through slots in the hopper lid 109.

With the hopper lid 109 installed over the hopper 106, the raw materials can be mixed at 309 by, e.g., varying rotation speed and/or direction of the mixing paddle 112 in the hopper 106. The ingredients can be blended for a defined period of time as specified by the selected recipe. The mixing should occur for an appropriate time to thoroughly mix the dough, for example, about 30 seconds to about 1200 seconds, where such mixing time is programmed to be proportional to the amount of raw materials added to the hopper 106, as indicated by the user in the activation step. The mixing period should be sufficient to form a dough ball in the mixing chamber of the hopper 106. At the end of the mixing period, it can be determined whether the flatbread dough should rest at 312. This can be based upon an input from the user, e.g., in response to a prompt from the control panel 103. If the dough is not to be rested, then the dough ball is transferred to the piecing station at 318. If the dough is to be rested, then at 315 the dough ball held in the hopper 106 for a defined period of time. After the dough has rested, then the processes proceeds to 318 where the dough ball is transferred to the piecing station.

To transfer the dough ball at 318, the gate 115 in the side of the hopper 106 can be opened using the latch mechanism 118 (FIGS. 1A and 2C) and the mixing paddle 112 can be rotated to push the dough ball into the horizontal trough 121. The auger or conveying screw 124 can be rotated to push the dough to the opening 130 at the end of the trough 121. The auger or conveying screw 124 can be rotated to initially charge the piecing station, and then rotated by a fixed about to discharge a defined amount of dough from the outlet. Once the appropriate amount of dough has been extruded, the dough piece is cut and transferred to the lower platen 136 (FIGS. 2A-2C) at 321. In some embodiments, the dough can be extruded through a die at the outlet 130 to form different shapes of flatbread. In some embodiments, the dough can be extruding using a plunger 125 (FIG. 2D). The piece of flatbread dough can be positioned on the lower platen 136 using, e.g., a pusher arm or other appropriate positioning device.

With the dough piece positioned below the pressing platen 142, the platen 142 can be driven to flatten the dough piece. The thickness of the pressed flatbread piece can be specified by the recipe or by the user. Heating the pressing platen 142 before pressing can assist in the flattening of the flatbread dough. The pressed dough piece can then be moved by or on the lower platen 136 into cooking zone 1, where the flatbread piece can be cooked at 324 for the specified time needed for the type of flatbread being cooked (e.g., roti, tortilla, etc.). After cooking in zone 1, the flatbread piece can be transferred to cooking zone 2 for additional cooking at 330. As illustrated in FIG. 3, the partially cooked flatbread piece can be flipped before additional cooking at the appropriate time and temperature. The flatbread can also be cooked via radiant heat from a radiant heating element 160 situated above the flatbread at 330. Once the flatbread is fully cooked, and optionally puffed as desired, the flatbread can be ejected at 333 into a user-supplied container for consumption. If another flatbread piece is to be prepared as 336, then the process returns to 321 where the next dough piece can be cut and positioned on the lower platen 136 for pressing and cooking. Otherwise, the process comes to an end. The flatbread piece can be cut, cooked and ejected from the flatbread machine 100 in about 30 seconds to about 2 minutes per flatbread piece.

Figure 6:
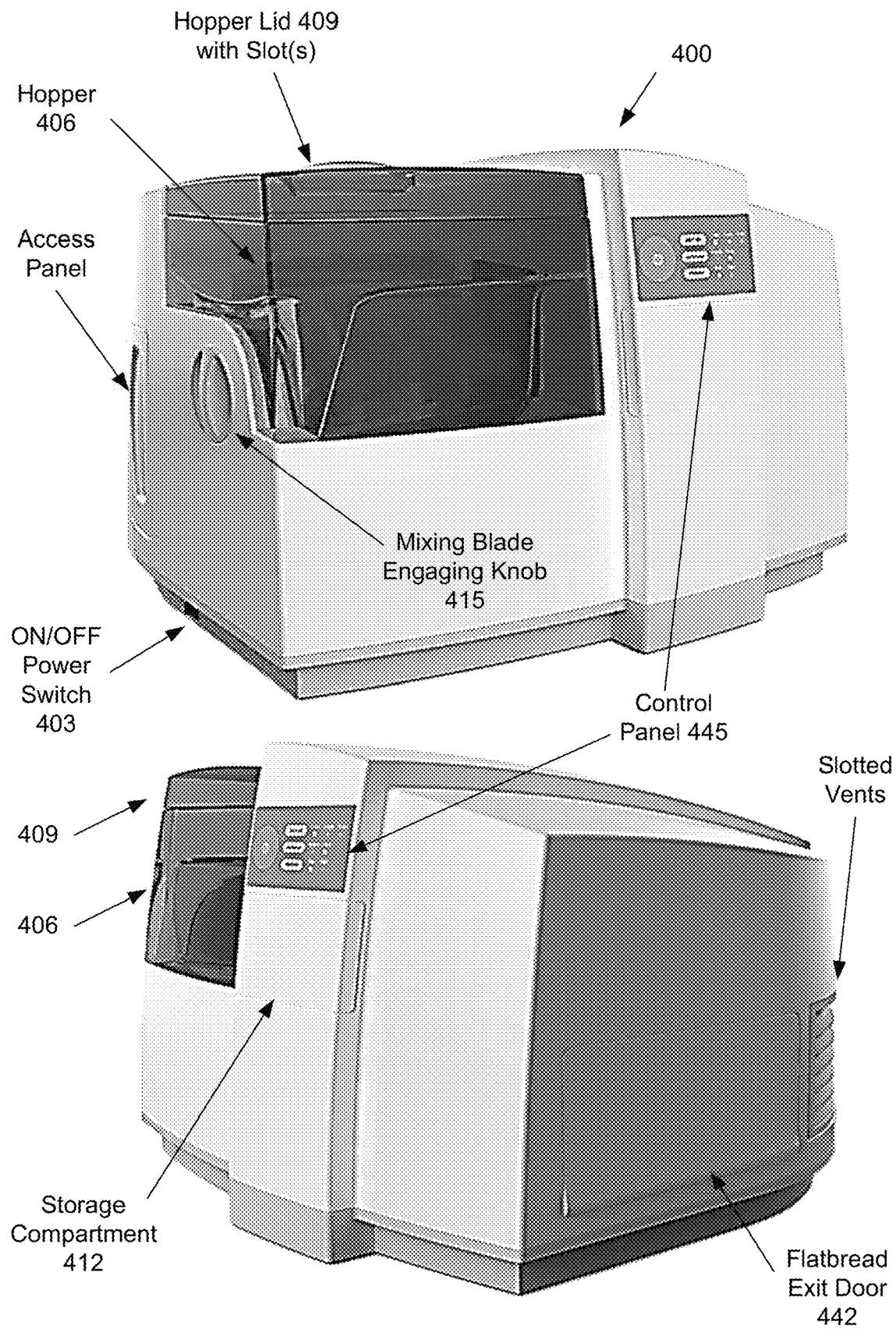
FIG. 6 includes perspective views of another example of a flatbread machine in accordance with various embodiments of the present disclosure.

Referring now to FIG. 6, shown is another example of a self-contained flatbread machine 400 suitable for countertop or tabletop use that can prepare flatbread in small batches for consumption. Broadly, the flatbread machine 400 can include a series of stations or assemblies such as, e.g., a raw material addition station, a mixing station, a dough piecing station, a dough pressing station, at least one cooking zone, a flatbread ejection station, and/or combinations thereof. Each of these stations can be in operational communication with one or more other station to allow a plurality of flatbread pieces to be prepared substantially automatically after a user places the raw materials in the raw material addition station and the operator activates the flatbread machine 400, e.g., through an ON/OFF switch 403 or the like.

In one aspect, the raw materials addition station comprises a hopper 406 such as, e.g., a horizontal hopper. The hopper 406 can include a mixing chamber with a size suitable for holding an appropriate amount of ingredients as typical for a single batch of flatbreads, such as the number likely to be consumed in a single meal for a typical household. In one aspect, the hopper 406 is of a suitable size to allow about 2, or about 4, or about 8, or about 10, or about 12, or about 16, or about 20, or about 24 or more flatbread pieces to be prepared from a single charging of raw materials into the hopper 406. In some aspects, the hopper 406 can have a capacity of about 1 cup, or about 2 cups, or about 3 cups, or about 4 cups or larger in relation to the amount of flour used, where any value can form the upper or lower endpoint in the range, as appropriate. Still further, the hopper 406 can be of a suitable size to allow charging of about 1 to about 4 cups of flour. In general, about 1 cup of flour will make about 4 to about 6 rotis, whereas 4 cups of flour will make about 18 to about 22 rotis.

In some aspects, a minimum amount of flour may need to be added to allow the flatbread machine 400 to be engaged. For example, if the user pushes the on/off switch 403, the flatbread machine 400 will not begin mixing the flour unless there is at least a minimum (or threshold) amount of raw materials (e.g., about ½ or about ¾ or 1 cup of flour) in the mixing chamber. The hopper 406 may also need to be covered by a hopper lid 409 before mixing can proceed.

In significant aspects, the hopper 406 is not configured to operationally engage with a capsule in which flatbread dough is incorporated, as shown in the '340 publication. Still further, in significant aspects, the hopper 406 is configured to include substantially all ingredients as incorporated by the user, as opposed to having individual charging containers as is shown in the '221 patent. Still further, the disclosure does not incorporate raw material containers that are operationally engaged with the hopper 406 or mixing station of the flatbread machine 400. Batch processing can produce better quality flatbread at lower costs.

The flatbread machine 400 can be provided with a set of measuring cups that assist the user in creating differently sized flatbread batches, and therefore differing amounts of flatbread pieces per batch. In some aspects, the flatbread machine can be configured with one or more storage bays or compartments 412 that allow the measuring cups to be storably engaged with the flatbread machine 400 when not in use, such as shown in FIG. 6. The hopper 406 can also be scored with markings to provide instructions to the user as to the amount of raw materials to be used for various batch sizes.

In some aspects, the hopper 406 can be made of a food-grade plastic material such as, e.g., polyethylene, polycarbonate or other suitable material, or can be made of a metal such as, e.g., stainless steel or other suitable material. The hopper 406 should be removable from the body of the flatbread machine 400 to enable cleaning. In this regard, the hopper 406 can be communicatively coupled and removeably engaged with the flatbread machine 400 as discussed elsewhere herein. Still further, variously-sized and removeably engaged hoppers 406 can be provided to allow the user to select a hopper size for a corresponding flatbread batch size. Such removeably engageable hoppers 406 can be configured for storage when not in use, such as by nesting or the like.

The hopper 406 can include a hopper lid 409 that allows the opening to the mixing chamber to be closed so as to reduce the possibility of dirt or other undesirable materials from entering the mixing station. The lid 409 can have a "lock out" feature to prevent a user's fingers from getting caught in the flatbread machine 400 while the mixing section is operational. The hopper opening can be configured to allow all raw materials to be introduced into the mixing section in bulk, that is, substantially simultaneously. In further aspects, the hopper lid 409 can have one or more opening(s) where the dry materials can be added to the mixing chamber. There can also be one or more smaller opening(s) for the addition of liquid raw materials. A hopper lid 409 configured with slots to introduce the raw materials is shown in FIG. 6.

In use, the raw materials can be incorporated into the hopper opening as desired by the user. The raw materials are mixable in the hopper 406 through use of a single mixing screw, array of mixing blades, or another suitable mixing apparatus. The mixing apparatus, whether a screw, blade(s) or otherwise, is removeably engaged with the hopper 406. In the example of FIG. 6, the mixing apparatus comprises a horizontal screw or mixing blade that can be rotated at different speeds and/or directions to blend the raw materials into the dough. A mixing blade engaging knob 415 illustrates one configuration where the mixing apparatus can be removeably engaged with the flatbread machine 400. The mixing apparatus can be suitably configured to enable efficient mixing of the raw materials used to prepare the flatbread. To better ensure that the raw materials do not become overly heated during the mixing operation, the mixing apparatus can be fabricated from a suitable plastic material. FIGS. 7A-7F show perspective, top and side views illustrating an example of the component arrangement within the flatbread machine 400, including a suitable mixing apparatus. As can be seen, the mixing blade 418 extends horizontally across the hopper 406 (not shown in FIGS. 7A-7F) to a cutting device 421 such as, e.g., a vertical or horizontal cutting blade or wire. The mixing blade 418 can be secured in the hopper 406 using the mixing blade engaging knob 415.

In some aspects, the user can engage the ON/OFF switch 403 to start the mixing process once the raw materials are added to the hopper 406. Because the hopper 406 can be configured with a lock out mechanism, the mixing step may not begin unless the hopper lid 409 is fully engaged. This will reduce the likelihood that a user will get her fingers caught in the mixing blade(s) 418 of the mixing apparatus.

In further aspects, the hopper lid 409 may be shaped to hold liquid ingredients (e.g., water or oil) and may have holes or slots to allow for addition of these ingredients into the mixing chamber on slow trickle basis. In use, after the dry materials have been placed into the mixing chamber of the hopper 406, a switch can be engaged, thus allowing the mixing apparatus to start mixing only the dry materials. The wet materials (e.g., water, oil etc.) can then be introduced through the hopper lid 409 to allow mixing of the dry and wet materials to occur. The mixing station can also incorporate a braking mechanism and/or emergency shut off switch to immediately stop the mixing apparatus, if needed.

Once mixing begins and the desired amount of wet and dry raw materials have been added to the hopper 406, the raw materials can be mixed into an appropriate flatbread dough suitable for cutting, pressing and, later, cooking. The mixing station can operate the mixing blade 418 continuously and run it until all or substantially all the raw materials are mixed into the dough. The mixed dough can then be formed into individual flatbread pieces for cooking as discussed elsewhere herein. The mixing station can include a timer to control the mixing time, where such timer is in operational communication with the other electronic controls of the flatbread machine 400. In a significant aspect, the mixing apparatus and mixing station do not include an adaptive kneading mechanism as disclosed in US Patent Publication No. 2015/0181897 (hereafter the '897 publication, which is hereby incorporated by reference in its entirety). In this regard, the mixing step utilizes what can be termed as "simple mixing," as opposed to a mixing step that is monitored and managed by software and sensors as in the '897 publication. In further aspects, the mixing step of this disclosure does not optimize the kneading of single dough balls, or include a kneading step that prepares dough balls as disclosed in the '897 publication.

While mixing, the mixing station can advance the flatbread dough forward along with the rotation of the mixing blade 418, such as when the blade 418 is configured as a mixing auger, along the length thereof. In order to obtain adequate mixing, the mixing apparatus can reverse direction periodically before returning to the forward direction in which the mixed dough will be advanced forward toward the piecing station. When using a mixing screw or blade 418, the screw length, diameter and flight can be configured to provide suitable mixing of the raw materials in a distance that allows the overall size of the flatbread machine 400, in conjunction with the additional features, to be kept within a footprint that is suitable for use in a residential kitchen or other space limited environment. Similarly, the mixing blade 418 or other device will be suitably configured to allow thorough mixing in an appropriately compact footprint.

As the dough mixture is advanced along the mixing station, the raw materials become suitably blended into a dough to allow a flatbread to be cooked therefrom. At the end of the mixing process, which corresponds to the dough reaching the exit location of the mixing station, the mixed ingredients comprise a dough suitable for cooking the flatbread. In some aspects, the mixed dough may optionally be allowed to rest for a short duration of time (e.g., for about 15 minutes) before piecing the dough for pressing and cooking. This can allow for better protein strand formation resulting in a better quality flatbread when cooked. When the appropriate length of dough is provided by the mixing station, such as can be measured by advancing the dough along an appropriate length of the mixing screw, the dough piece can be cut to the appropriate size by a blade to provide a portion control aspect for the flatbread pieces, which corresponds to a cutting or piecing station of the flatbread machine 400.

The dough piecing station can be operationally engaged to a drive unit (e.g., a stepper motor) to allow the dough to be cut into pieces for cooking, where the cut length corresponds to an amount of dough sufficient to provide an uncooked flatbread dough suitable for cooking after pressing as described further herein. The advance of the thoroughly mixed uncooked flatbread dough as directed by the mixing apparatus generally provides enough force to extrude the dough through a plate or die, which can be located adjacent to the cutting device 421. The shape of the die through which the dough can be extruded may vary. In some aspects, it may be a circle which is most common shape of the flatbread. But in some other aspects, the shape may be a triangle, a square, a rectangle, a star, etc. The user can use a die of their choosing allowing the flexibility for the flatbread machine 400 to make breads of varying shapes as desired by the operator.

When approximately the appropriate amount of dough has been extruded through the plate or die, the motor that is engaged with the cutting device 421 (e.g., a cutting blade, cutting wire, or other suitable cutting device) engages with the dough piece (either from a side or above or below the dough piece) to cut the dough piece. The cutting or piecing station is positioned so that, after cutting, the dough piece will be appropriately situated on a lower platen 424 (e.g., an indexing platform) for pressing and cooking. An example of a dough cutting/piecing station is illustrated in FIGS. 7A-7F.

In some aspects, the cut dough piece can then be directed onto the flat surface of the lower platen 424 where the dough will be flattened first at a pressing station followed by cooking in a cooking station. As can be seen from the top view of FIG. 7B, the cut dough piece will land on the lower platen 424 which can be rotated to appropriately position the dough piece in the pressing station. In some aspects, the pressing station comprises a pressing arm or platen 427 that is engageable with the dough piece situated on the lower platen 424 to flatten the dough into a pre-cooked flatbread piece. After cutting, the dough piece can be positioned approximately in the center location of the pressing platen 427. This location allows the flatbread dough to be pressed approximately outwardly from the center of the platen 427, which will result in the uncooked pressed flatbread dough having approximately circular shape, or other shape based upon the shape of the die through which the dough was extruded. In some aspects, the pressing platen 427 is from about 5 inches to about 9 inches, or about 6 inches to about 8 inches in diameter. The size of the platen 427 corresponds generally to the resulting diameter of the flatbread when the cut dough piece is pressed generally from a center location of the platen.

Figure 7A:
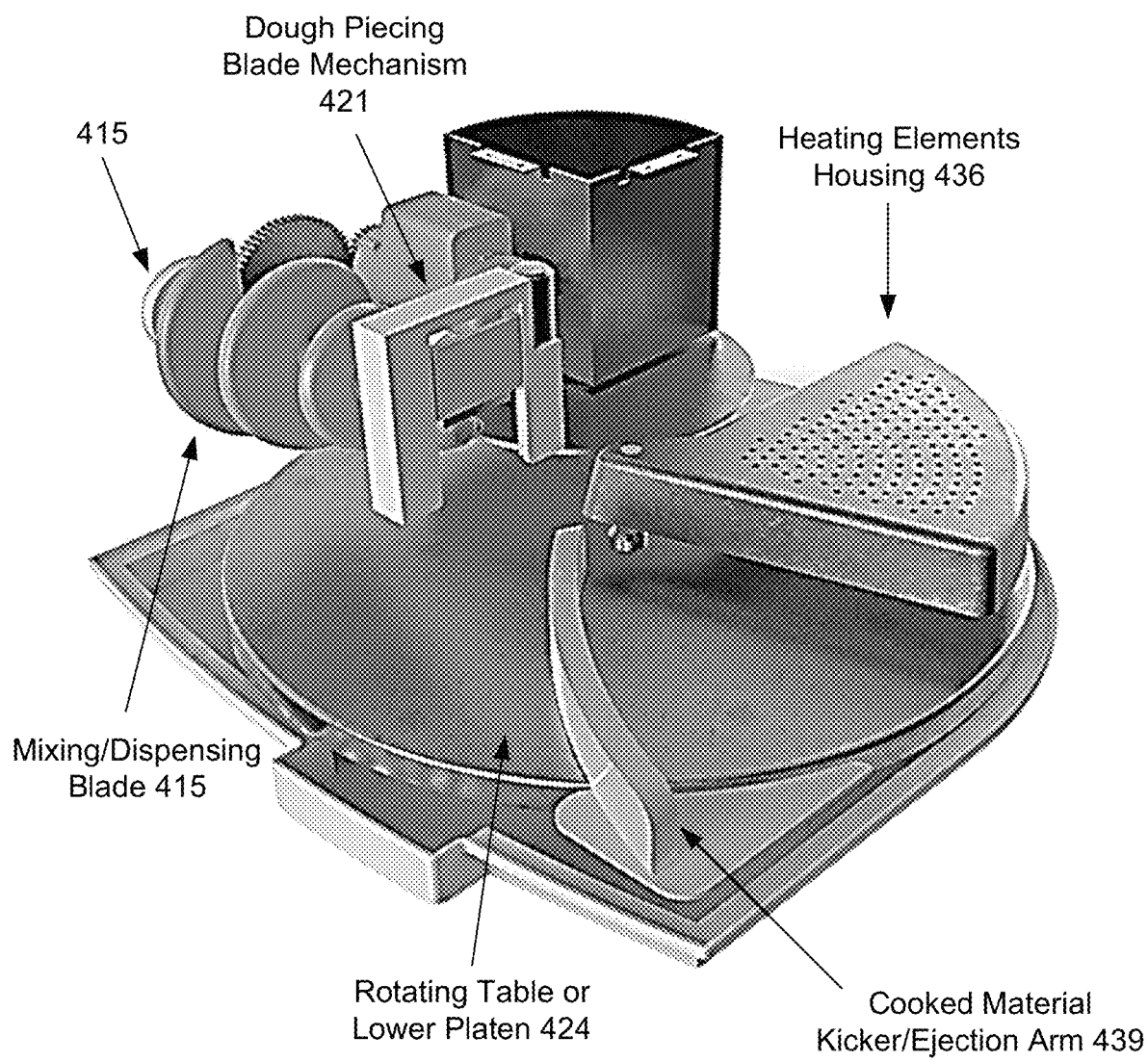
FIGS. 7A through 7F are perspective, top and side views illustrating an example of the component arrangement within the flatbread machine of FIG. 6 in accordance with various embodiments of the present disclosure.
Figure 7B:
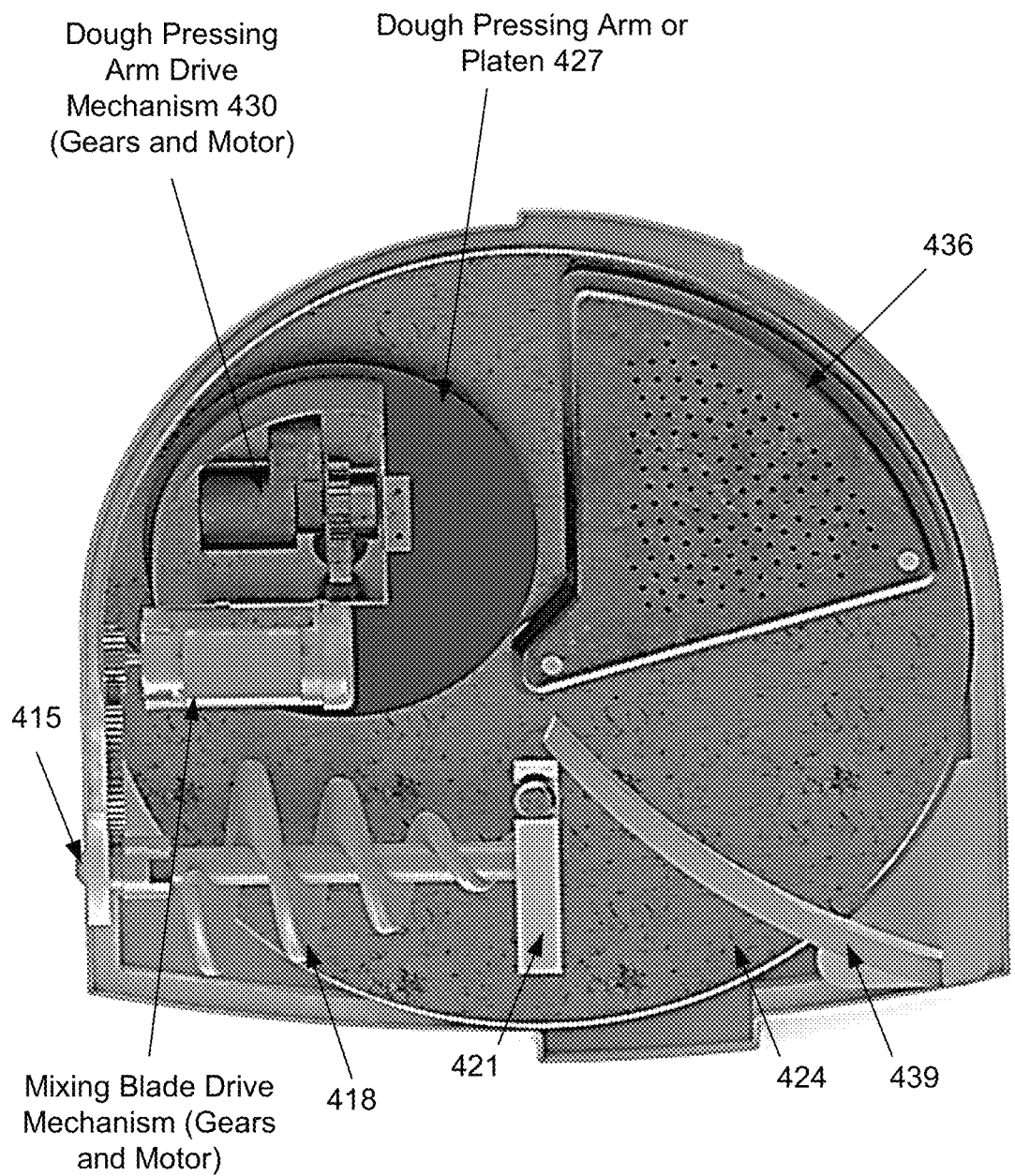
Figure 7C:
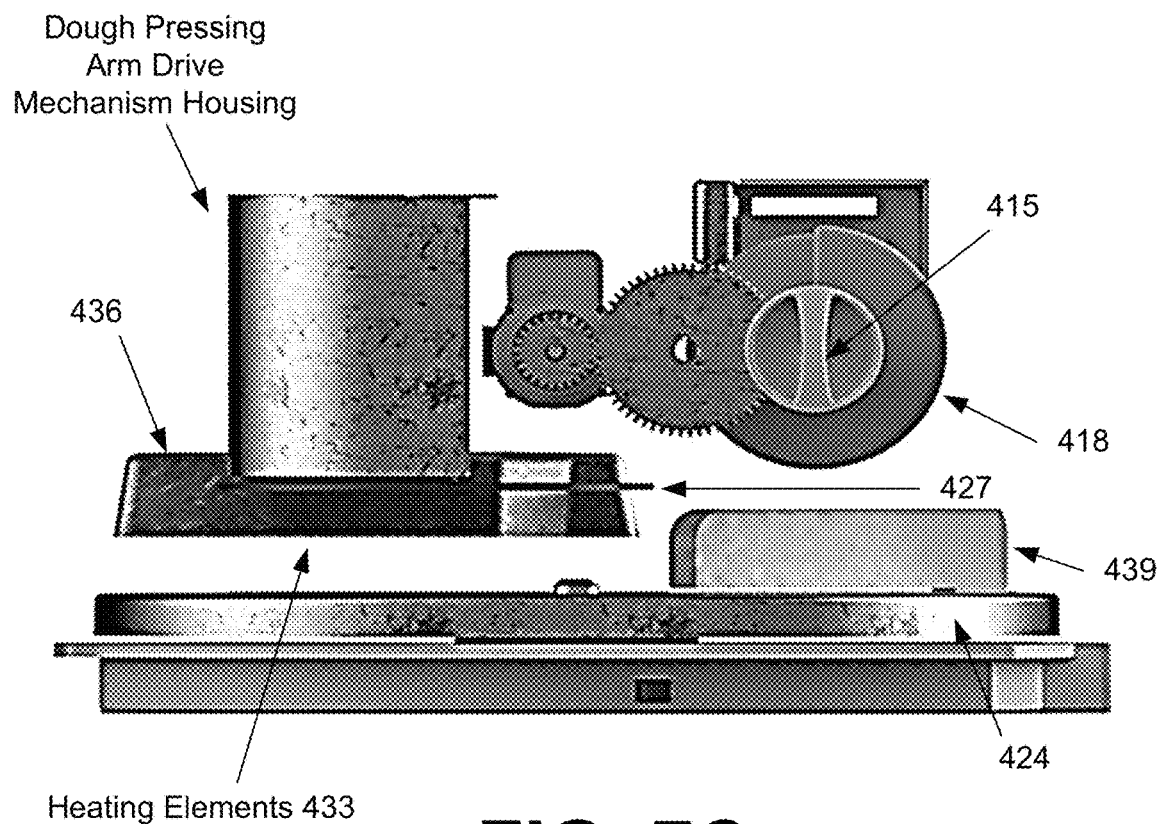
Figure 7D:
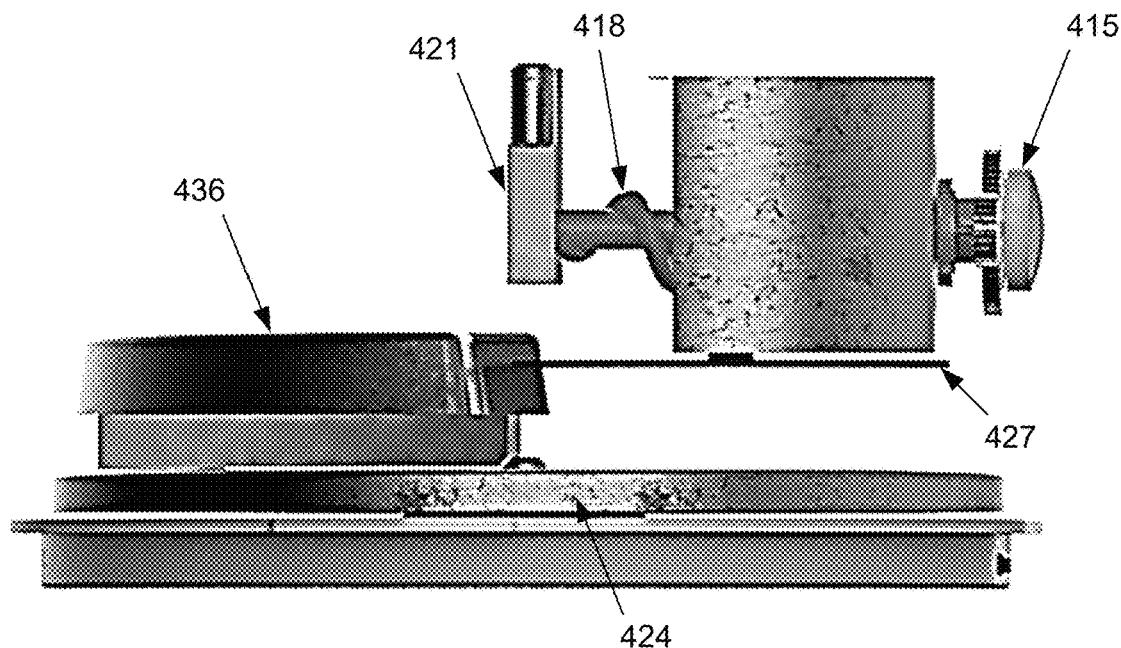
Figure 7E:
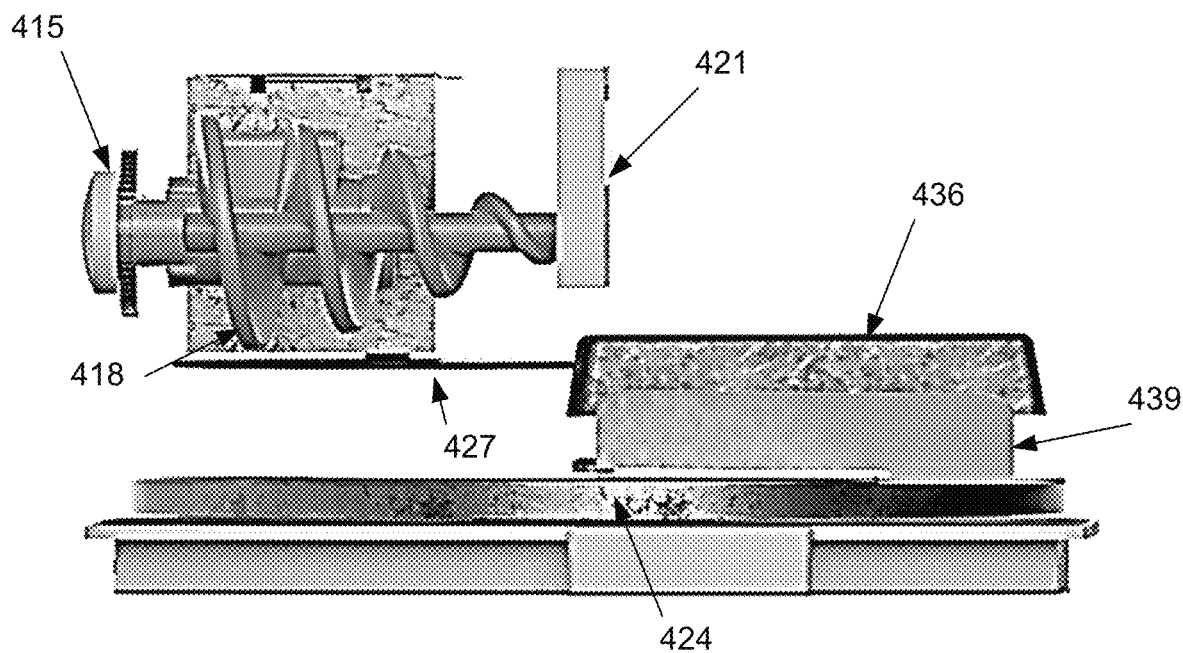
Figure 7F:
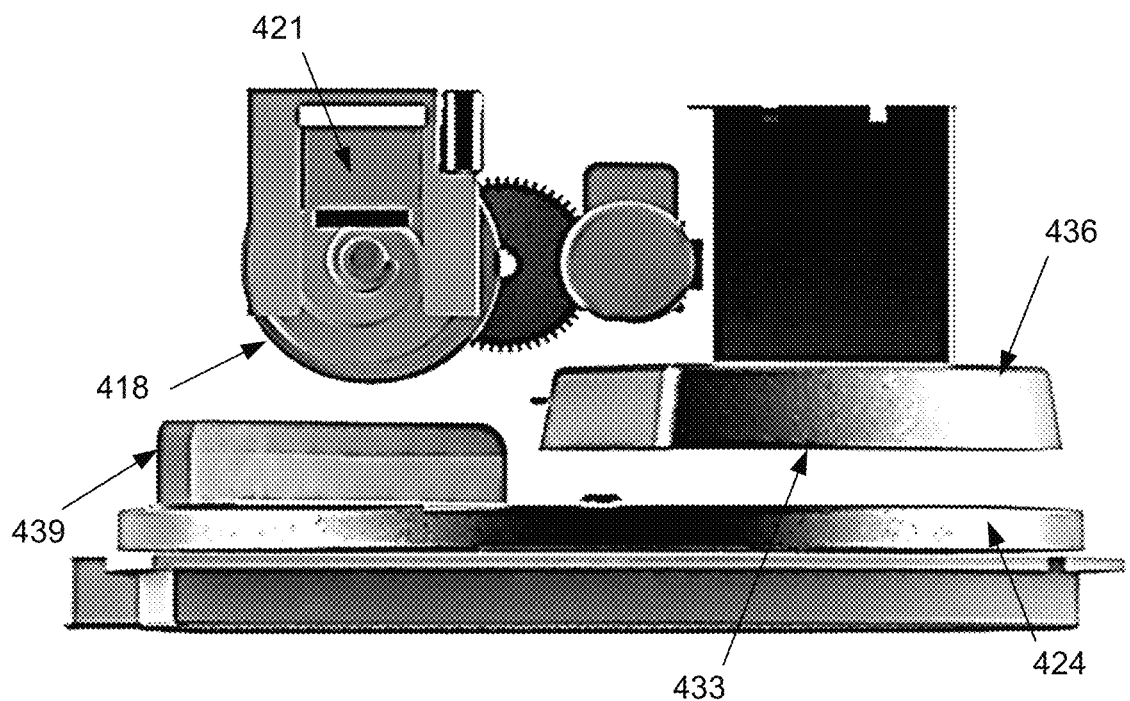

The pressing platen 427 can include a warming feature, such as heating elements located internally therein, radiating outwardly to a dough facing surface of the platen 427. An exemplary configuration for the dough pressing platen with heating feature is illustrated in FIG. 7B. At least the dough facing surface of the pressing arm or platen 427 can comprise a non-stick surface. In separate examples, the dough facing surface can be ceramic, Teflon® coated or another suitable coating. The flatbread dough can be pressed to the desired thickness as configured by the user and/or the specified flatbread recipe. The flattened dough can them be cooked at the configured temperatures as specified by the recipe for the need of the specific flatbread cooking.

In some aspects, the pressing platen is operationally engaged with a rack and pinion mechanism 430 that is itself operationally engaged with a motor that can be configured to allow the pressing platen 427 to perform the pressing step. The pressing platen 427 can also be operationally engaged with a hydraulic press or other mechanical device. Such pressing platen 427 and any equipment associated therewith will suitably control the force applied by the platen or the distance that the platen travels, either or both of which can be utilized to provide suitable dough thickness.

An exemplary configuration of the dough pressing arm/platen is shown in FIGS. 4 and 5. In use, the mechanical aspects of the pressing station are configurable to provide the amount of pressure appropriate to provide a pre-cooked flatbread piece having a thickness suitable to make roti, tortillas etc. The flattening element is configured to press the dough piece to the appropriate thickness for cooking. In this regard, after flattening and prior to cooking, the dough piece can be flattened to a thickness of from about 0.1 mm to about 3.2 mm, from about 0.2 mm to about 1.5 mm, or from about 0.3 mm to about 0.8 mm.

Once the pressed flatbread dough exits the pressing station of the flatbread machine 400, the flattened dough piece moves into a first cooking zone by way of the lower platen 424. For example, the use of a rotating indexing platform as the lower platen 424 provides a substantially continuous cooking station, as opposed to discrete stations as disclosed in the '358 patent, which improves the operation of the cooking process. In other aspects, the lower platen 424 may be a stationary platform and the dough pieces can be moved between the different zones using an external mechanism such as, e.g., a rotating arm. In other implementations, the lower platen 424 can be a conveyor belt or other linear or rotational assembly configured to facilitate movement of the flatbread dough between the pressing station and cooking zones.

The lower platen 424 can comprise a surface material that has a coefficient of friction that both allows the flatbread dough to be cooked appropriately, and to be easily removable when cooked. In separate examples, the dough facing surface of the lower platen 424 can be ceramic coated, Teflon® coated or treated with another suitable coating. Moreover, the surface of the lower platen 424 has a heat transfer coefficient that allows heat to be transferred appropriately from one or more heating elements. In this regard, the lower platen 424 can comprise a ceramic coated material, which is both relatively non-stick and has a suitable heat transfer profile.

Generally, the flatbread can first be cooked by a combination of direct (contact) heating through the lower platen 424 (via heating elements below) and via radiant heat from heating elements above the flatbread piece in the cooking station. This process can allow both sides of the flatbread to be cooked. The lower platen 424 can comprise a heating feature. In this regard, the lower platen 424 can include heating elements, such as conductive heating elements, in an interior portion of the lower platen 424. The lower platen 424 is suitably configured to enable the internally generated heat to transfer to the dough facing surface of the disc to assist in cooking the dough, as well as reducing the propensity of the dough to stick to the surface thereof. The conductive heating elements of the indexing platform are configured to provide a cooking temperature for the dough facing surface of the lower platen 424 from about 250 deg. F to about 1000 deg. F, or from about 400 deg. F to about 975 deg. F, or from about 500 deg. F to about 940 deg. F.

A lower surface of the lower platen 424 can be fully or partially enclosed within the housing of the flatbread machine 400 to prevent the user from coming in contact with the heated surface of the platform. The machine housing can be insulated to reduce heat transfer to the exterior of the machine and to redirect heat to the cooking zone by way of radiant heat.

In some aspects, the flatbread can be cooked via radiant heat from heating elements situated above the flatbread in the cooking station so as to bake the flatbread. Such radiant heat can be generated by heating elements 433 such as, for example, resistive heating elements. Transfer of radiant heat throughout the cooking station can be facilitated by a fan that is configured to improve circulation of the heat within the cooking zone. An exemplary configuration of the heating elements 433 (FIGS. 7C and 7F), which in this example are enclosed within a housing 436, as shown in FIGS. 7A and 7B. Heat can be vented out of the machine, such as with the slotted vents as shown in FIG. 6.

In some aspects, there will be at least one cooking zone in the cooking station. In a further aspect, there will be at least two cooking zones in the cooking station where different heating profiles are provided to allow the flatbread to be subjected to different temperatures during the cooking process. For example, cooking zone 1 can apply a temperature of from about 300 deg. F to about 450 deg. F for about 2 seconds to about 30 seconds, and cooking zone 2 can apply a temperature of from about 400 deg. F to about 600 deg. F. for about 5 to about 40 seconds. Radiant heat can them be applied from about 750 deg. F to about 1000 deg. F for about 5 seconds to about 30 seconds.

In some aspects, the lower platen 424 can be configured to move/rotate substantially continuously. Yet further, the lower platen 424 can be configured to stop one or more times during to allow the pressed flatbread dough to be subjected to heating in the cooking zone for a time longer than if the indexing platform was moving substantially continually. In some aspects, the lower platen can be configured to stop or slow in cooking zone one so that the pressed flatbread piece is subjected to heating in that zone for a longer period, for example about 10 to about 90 seconds. In this regard, the flatbread dough piece can bake substantially to completion in cooking zone 1. When the pressed flatbread dough piece is substantially baked, the indexing platform can begin to rotate again and enter a second cooking zone that is maintained at a higher temperature than cooking zone 1. The substantially cooked flatbread dough piece can travel through cooking zone 2 to for from about 5 to about 25 seconds. The substantially cooked flatbread dough piece can be puffed and or browned in this higher temperature in cooking zone 2.

If the second cooking zone is not used, the flatbread dough can travel through cooking zone 1 for a longer time. In this regard, the temperature of cooking zone 1 can be reduced to account for the longer baking time.

When the cooking cycle is completed, that is, when the flatbread dough piece leaves the one or more cooking zones, which is timed according to the speed of the indexing platform and temperature applied in the at least two cooking zones of the cooking station, the fully cooked flatbread enters the ejection zone where it is pushed or "kicked" off the lower platen 424 by an arm or spatula for collection, such as onto a plate or into a basket. As noted, the surface of the lower platen 424 is suitably non-stick to allow the flatbread to be easily removed from the disc. An example of an ejection arm 439 is illustrated in FIGS. 7A and 7B. An exit door 442 from which the cooked flatbread can be ejected is shown in the closed position in FIG. 6.

Those parts of the flatbread machine 400 that touch the flatbread raw materials and dough are readily cleanable. In this regard, at least the hopper 406, lid 409, mixing apparatus and housing, extrusion chamber, extrusion plate or die, extrusion plate or die locking apparatus, cutting device 421 are each, independently, removeably engaged with the flatbread machine 400. The lower platen 424 can be accessible through a door in the machine housing to allow thorough cleaning when desired. When cleaning the lower platen 424, the user can engage a switch that can allow the platform to rotate freely to allow all of the platform to be cleaned by enabling rotation thereof. The pressing platen 427 can also be accessible for cleaning, such as shown with the access panel in FIG. 6. This can be done when the flatbread machine 400 is not in operation and all surfaces of the machine, including the internal surfaces, are at room temperature. Any piece of the flatbread machine 400 that is removable for cleaning should be dishwasher safe. The electronics are sealed so that water damage does not occur during cleaning.

The machine includes at least one control panel 445 for user operation. The control panel 445 can interact with processing circuitry configured to control the flatbread making process as previously discussed with respect to FIG. 4. Operational inputs and outputs that can provided through the control panel 445 can include at least a power ON/OFF, start/stop, "cycle finished," audible signals, batch size (e.g., 1 cup, 2 cups, 3 cups, etc. and/or number of flatbread pieces and, in some aspects, desired thickness of the pieces. The power on/off can be included on the control panel 445 or the switch 403 can be located at another location on the machine as shown in FIG. 6. In some aspects, the control panel 445 can allow for the user to select the recipe the flatbread machine 400 will use. For example, there may be one recipe for roti and another one for tortilla and third one for some other flatbread.

The raw materials used will, of course, depend on the type of flatbread being made. For example, atta flour can be used for roti. For tortillas, white, yellow and/or blue corn flour can be used for corn tortillas, and wheat flour can be used for flour tortillas. Other optional ingredients may be added to the mixing chamber to make other type of flat breads of user's choice. For example, the use may add raw and chopped vegetables such as, e.g., fenugreek leaves, spinach, pre-cooked and mashed vegetables such as potatoes, or green peas, etc. to make special (designer) flatbreads. Dry or liquid flavorings can also be added, if desired. For example, spice mixes can be added to dry mix of ingredients to make spicy or sweet rotis, or jalapeno oil or pieces can be added to make spicy tortillas, for example.

Figure 8:
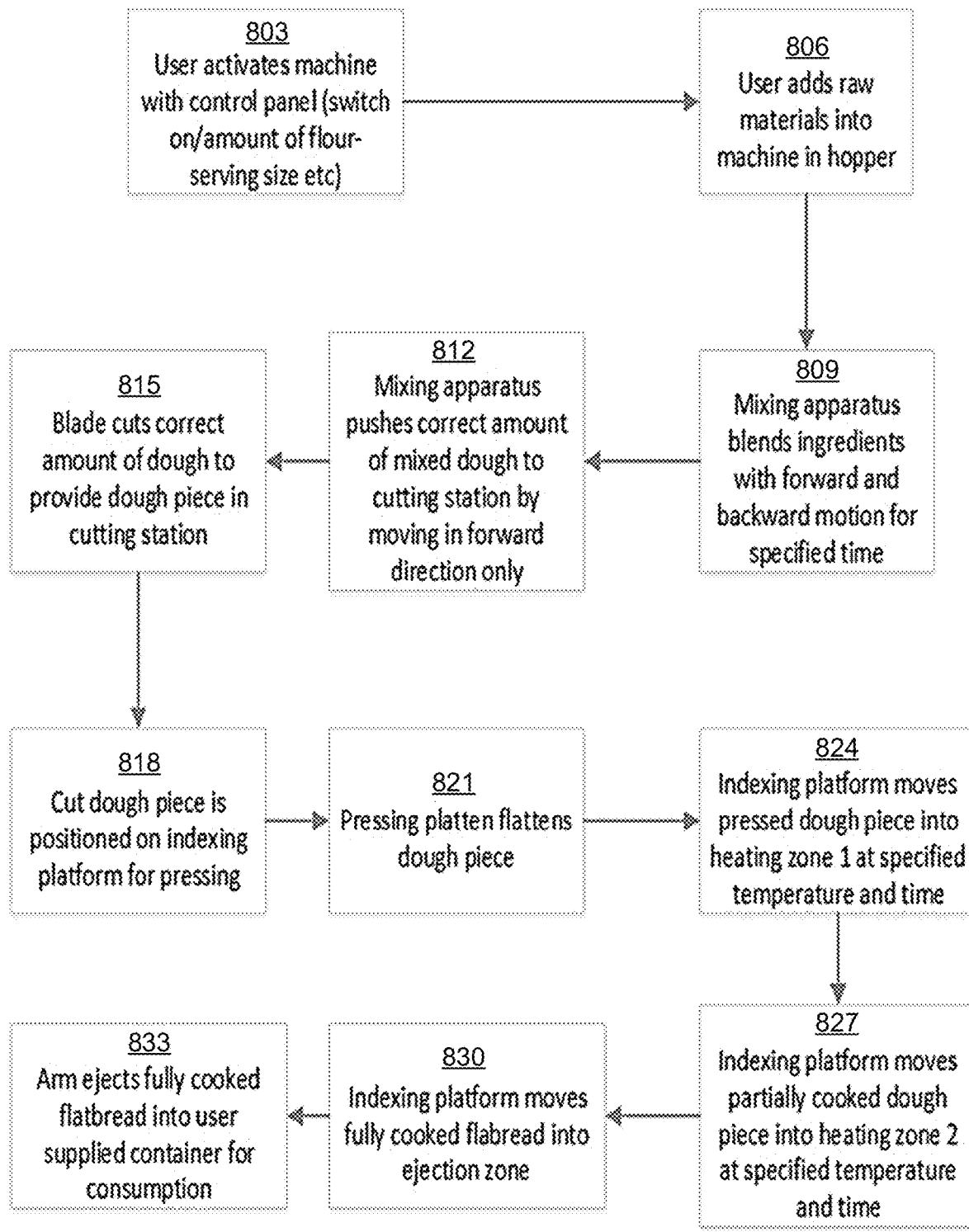
FIG. 8 is a flowchart illustrating an example of a flatbread making process utilizing the flatbread machine of FIG. 6 in accordance with various embodiments of the present disclosure.

Referring to FIG. 8, shown is an example of a process for making a plurality of flatbread pieces with the flatbread machine 400 of FIG. 6. At 803, the user can activate the machine with the control panel 445 and/or ON/OFF switch 403. At 803, the user can specify the serving size. The user can add the bulk raw materials into the hopper 406 in the appropriate amounts at 806, such as in the amounts shown above. When the hopper lid 409 is closed, the mixing apparatus can begin blending the raw materials by forward and reverse motion of the mixing blade 418 at 809. The mixing can occur for an appropriate time to thoroughly mix the dough, for example, about 30 or about 1200 seconds, where such mixing time can be controlled by the processing circuitry to be proportional to the amount of flour added to the hopper 406, as indicated by the user during activation at 803. When the mixing is completed, the mixing blade 418 can move forward to push the correct amount of dough for cutting or piecing 812 and the dough is cut into the appropriate size at 815. At 818, the cut dough piece is positioned on the lower platen 424 for pressing by the pressing platen 427 at 821. The pressed dough piece can then be moved by or on the lower platen 424 into cooking zone 1 to cook the flatbread dough for the specified time needed for the flatbread being cooked (e.g., roti, tortilla etc.) at 824. At 827, which may be optional, the lower platen 424 (or other external mechanism) can move the partially cooked flatbread into cooking zone 2 for the appropriate time and temperature. Once the flatbread is fully cooked and optionally puffed as desired, it is moved into the ejection zone at 830, followed by ejection into a user-supplied container for consumption at 833. The flatbread can be cut, cooked and ejected from the flatbread machine 400 in about 30 seconds to about 2 minutes per flatbread piece.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A machine for preparing flatbread comprising:
a hopper comprising a mixing chamber configured for bulk addition of raw materials for preparation of a plurality of flatbread pieces, the raw materials comprising at least flour, water and oil, and where each of the raw materials are not each engageably stored with the machine prior to addition of the raw materials to the hopper;
a mixing assembly in operational communication with the hopper, the mixing assembly configured to blend the raw materials in the mixing chamber, wherein the raw materials are mixed for a time period suitable to allow the raw materials to be mixed into a flatbread dough mixture;
a hopper lid configured to cover the mixing chamber of the hopper, the hopper lid including openings configured to allow a portion of the raw materials to be added to the mixing chamber during blending by the mixing assembly;

a dough piecing assembly in operational communication with the mixing assembly, the dough piecing assembly configured to generate a dough piece from the flatbread dough mixture, the dough piecing assembly comprising a cutting device that cuts an extruded portion of the flatbread dough mixture to produce the dough piece;

a dough pressing assembly in operational communication with the dough piecing assembly, the dough pressing assembly comprising a pressing platen configured to apply suitable pressure to the dough piece to form a pressed flatbread dough piece on a dough contacting surface of a lower platen located below the pressing platen, the dough contacting surface comprising a substantially non-stick surface;

a cooking zone in operational communication with the dough pressing assembly, where the lower platen is configured to transfer the pressed flatbread dough piece to the cooking zone on the dough contacting surface, the cooking zone comprising a heating element located below the lower platen opposite the dough contacting surface, the heating element configured to maintain a cooking temperature while the pressed flatbread dough piece is located in the cooking zone; and a flatbread election station configured to remove a cooked flatbread from the machine.

2. The machine of claim 1, wherein the cooking temperature in the cooking zone is maintained in a range from about 300 deg. F to about 600 deg. F.

3. The machine of claim 1, further comprising a second cooking zone subsequent to the first cooking zone, wherein the second cooking zone is maintained at a second cooking temperature for a defined period of time while the pressed flatbread dough piece is located in the second cooking zone.

4. The machine of claim 3, wherein the second cooking temperature is higher than the first cooking temperature of the first cooking zone.

5. The machine of claim 3, further comprising an actuation arm configured to transfer the pressed flatbread dough piece from the first cooking zone to the second cooking zone.

6. The machine of claim 5, wherein the pressed flatbread dough piece is transferred from the dough contacting surface of the lower platen to a cooking surface of a lower cooking platform, where the pressed flatbread dough piece is flipped over while being transferred to the cooking surface of the lower cooking platform.

7. The machine of claim 6, wherein the second cooking zone comprises a second heating element located below the lower cooking platform opposite the cooking surface, the second heating element configured to maintain the second cooking temperature while the pressed flatbread dough piece is located in the second cooking zone.

8. The machine of claim 6, wherein the second cooking zone comprises a radiant heating element positioned above the cooking surface of the lower cooking platform, the radiant heating element configured to apply radiant heat to the pressed flatbread dough piece in a range from about 750 deg. F to about 1000 deg. F.

9. A machine for preparing flatbread, comprising:

a hopper comprising a mixing chamber configured for bulk addition of raw materials for preparation of a plurality of flatbread pieces, the raw materials comprising at least flour, water and oil, and where each of the raw materials are not each engageably stored with the machine prior to addition of the raw materials to the hopper, wherein the hopper comprises a gate separating the mixing chamber of the hopper from an extrusion trough including a conveying screw configured to extrude a flatbread dough mixture for cutting by a cutting device;

a mixing assembly in operational communication with the hopper, the mixing assembly configured to blend the raw materials in the mixing chamber, wherein the raw materials are mixed for a time period suitable to allow the raw materials to be mixed into the flatbread dough mixture;

a dough piecing assembly in operational communication with the mixing assembly, the dough piecing assembly configured to generate a dough piece from the flatbread dough mixture, the dough piecing assembly comprising the cutting device that cuts an extruded portion of the flatbread dough mixture to produce the dough piece;

a dough pressing assembly in operational communication with the dough piecing assembly, the dough pressing assembly comprising a pressing platen configured to apply suitable pressure to the dough piece to form a pressed flatbread dough piece on a dough contacting surface of a lower platen located below the pressing platen, the dough contacting surface comprising a substantially non-stick surface;

a cooking zone in operational communication with the dough pressing assembly, where the lower platen is configured to transfer the pressed flatbread dough piece to the cooking zone on the dough contacting surface, the cooking zone comprising a heating element located below the lower platen opposite the dough contacting surface, the heating element configured to maintain a cooking temperature while the pressed flatbread dough piece is located in the cooking zone; and a flatbread election station configured to remove a cooked flatbread from the machine.

10. The machine of claim 9, wherein the pressing platen comprises an integrated heating element configured to preheat a pressing surface of the pressing platen prior to applying pressure to the dough piece.

11. The machine of claim 9, wherein the pressed flatbread dough piece has a thickness from about 0.1 mm to about 3.2 mm.

12. The machine of claim 9, wherein the dough piecing assembly comprises a shaped die through which the flatbread dough mixture is extruded, the dough piece having a shape corresponding to the shaped die.

13. The machine of claim 12, wherein the pressed flatbread dough piece is substantially triangular, square or rectangular in shape.

14. The machine of claim 9, wherein the mixing assembly comprises a mixing paddle located at the bottom of the mixing chamber of the hopper.

15. The machine of claim 9, wherein the gate is released to facilitate transfer of the flatbread dough mixture to the extrusion trough after a specified rest period.

16. The machine of claim 9, wherein the cooking temperature in the cooking zone is maintained in a range from about 300 deg. F to about 600 deg. F.

17. The machine of claim 9, comprising a radiant heating element positioned above a cooking surface of a lower cooking platform, the radiant heating element configured to apply radiant heat to the pressed flatbread dough piece.

18. A process of making a plurality of flatbread pieces, comprising:

adding bulk raw materials to a mixing chamber of a hopper of a flatbread machine, the raw materials comprising flour, water and oil and, optionally, salt, where each of the added raw materials are not engageably stored with the flatbread machine prior to addition of the raw materials to the hopper;

mixing the raw materials in the mixing chamber for a time period suitable to allow the raw materials to blend into a flatbread dough mixture, where the raw materials are mixed when a hopper lid is in a closed position over the mixing chamber and a user activates operation of the flatbread machine;

generating a dough piece by cutting an extruded portion of the flatbread dough mixture with a cutting device, the dough piece deposited on a dough contacting surface of a lower platen for pressing, the dough contacting surface comprising a substantially non-stick surface;

pressing the dough piece with a pressing platen to form a pressed flatbread dough piece on the dough contacting surface of the lower platen, the pressing platen configured to apply suitable pressure to the dough piece to form the pressed flatbread dough piece with a specified thickness;

transferring the pressed flatbread dough piece to a cooking zone on the dough contacting surface of the lower platen, the cooking zone comprising a heating element located below the lower platen opposite the dough contacting surface, the heating element configured to maintain a cooking temperature while the pressed flatbread dough piece is located in the cooking zone for a specified time period;

heating the pressed flatbread dough piece on a cooking surface of a lower cooking platform with a radiant heating element positioned over the cooking surface prior to ejecting a cooked flatbread piece from the flatbread machine; and ejecting the cooked flatbread piece from the flatbread machine after cooking the pressed flatbread dough piece in the cooking zone.

19. The process of claim 18, further comprising transferring the pressed flatbread dough piece to the cooking surface of the lower cooking platform in a second cooking zone, where the pressed flatbread dough piece is flipped over while being transferred to the cooking surface of the lower cooking platform, and where the cooked flatbread piece is ejected from the flatbread machine after cooking the pressed flatbread dough piece in the second cooking zone.

20. The process of claim 18, further comprising depositing at least one drop of oil or melted butter on the cooked flatbread piece before ejection from the flatbread machine.

* * * * *